(12) United States Patent
Panasyuk et al.

(10) Patent No.: US 7,562,146 B2
(45) Date of Patent: Jul. 14, 2009

(54) ENCAPSULATING PROTOCOL FOR SESSION PERSISTENCE AND RELIABILITY

(75) Inventors: Anatoliy Panasyuk, Bellevue, WA (US); Bradley J. Pedersen, Parkland, FL (US); David Stone, Lauderdale By-The-Sea, FL (US); Terry Treder, Highland Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 977 days.

(21) Appl. No.: 10/683,881

(22) Filed: Oct. 10, 2003

(65) Prior Publication Data

US 2005/0080907 A1   Apr. 14, 2005

(51) Int. Cl.
G06F 15/16 (2006.01)
(52) U.S. Cl. .......................... 709/227; 709/239; 726/15
(58) Field of Classification Search ................ 709/227, 709/230, 239; 455/439; 370/466; 703/24; 726/15
See application file for complete search history.

(56) References Cited

U.S. PATENT DOCUMENTS

| 4,438,511 A | 3/1984 | Baran |
| 4,649,510 A | 3/1987 | Schmidt |
| 4,736,369 A | 4/1988 | Barzilai et al. |
| 4,750,171 A | 6/1988 | Kedar et al. |
| 4,768,190 A | 8/1988 | Giancarlo |
| 4,837,800 A | 6/1989 | Freeburg et al. |
| 4,893,307 A | 1/1990 | McKay et al. |
| 4,912,756 A | 3/1990 | Hop |
| 4,924,378 A | 5/1990 | Hershey et al. |
| 4,941,089 A | 7/1990 | Fischer |
| 4,953,159 A | 8/1990 | Hayden et al. |
| 5,010,549 A | 4/1991 | Katou et al. |
| 5,021,949 A | 6/1991 | Morten et al. |
| 5,159,592 A | 10/1992 | Perkins |
| 5,181,200 A | 1/1993 | Harrison |
| 5,204,897 A | 4/1993 | Wyman |
| 5,210,753 A | 5/1993 | Natarajan |
| 5,212,806 A | 5/1993 | Natarjan |
| 5,220,501 A | 6/1993 | Lawlor et al. |
| 5,224,098 A | 6/1993 | Bird et al. |
| 5,241,542 A | 8/1993 | Natarajan et al. |

(Continued)

FOREIGN PATENT DOCUMENTS

EP   0 384 339 A2   8/1990

(Continued)

OTHER PUBLICATIONS

Alanko, T. et al. "Measured performance of data transmission over cellular telephone networks." Publication C-1994-53, pp. 1-20, University of Helsinki, Department of Computer Science, Helsinki, 1994.

(Continued)

*Primary Examiner*—Jungwon Chang
(74) *Attorney, Agent, or Firm*—Choate Hall & Stewart, LLP

(57) ABSTRACT

The invention relates to network communications. A first protocol that encapsulates a plurality of secondary protocols is used to communicate over a network. Use of the first protocol provides session persistence and a reliable connection between a client and a host service.

23 Claims, 16 Drawing Sheets

U.S. PATENT DOCUMENTS

| | | |
|---|---|---|
| 5,276,680 A | 1/1994 | Messenger |
| 5,307,490 A | 4/1994 | Davidson et al. |
| 5,325,361 A | 6/1994 | Lederer et al. |
| 5,349,678 A | 9/1994 | Morris et al. |
| 5,359,721 A | 10/1994 | Kempf et al. |
| 5,390,297 A | 2/1995 | Barber et al. |
| 5,410,543 A | 4/1995 | Seitz et al. |
| 5,412,654 A | 5/1995 | Perkins |
| 5,412,717 A | 5/1995 | Fischer |
| 5,416,842 A | 5/1995 | Aziz |
| 5,426,637 A | 6/1995 | Derby et al. |
| 5,442,633 A | 8/1995 | Perkins et al. |
| 5,442,791 A | 8/1995 | Wrabetz et al. |
| 5,446,736 A | 8/1995 | Gleeson et al. |
| 5,446,915 A | 8/1995 | Pierce |
| 5,448,561 A | 9/1995 | Kaiser et al. |
| 5,455,953 A | 10/1995 | Russell |
| 5,475,819 A | 12/1995 | Miller et al. |
| 5,481,535 A | 1/1996 | Hershey |
| 5,481,721 A | 1/1996 | Serlet et al. |
| 5,490,139 A | 2/1996 | Baker et al. |
| 5,491,750 A | 2/1996 | Bellare et al. |
| 5,491,800 A | 2/1996 | Goldsmith et al. |
| 5,499,343 A | 3/1996 | Pettus |
| 5,504,814 A | 4/1996 | Miyahara |
| 5,509,070 A | 4/1996 | Schull |
| 5,515,508 A | 5/1996 | Pettus et al. |
| 5,524,238 A | 6/1996 | Miller et al. |
| 5,544,246 A | 8/1996 | Mandelbaum et al. |
| 5,548,723 A | 8/1996 | Pettus |
| 5,550,976 A | 8/1996 | Henderson et al. |
| 5,550,981 A | 8/1996 | Bauer et al. |
| 5,553,060 A | 9/1996 | Obermanns et al. |
| 5,553,139 A | 9/1996 | Ross et al. |
| 5,557,732 A | 9/1996 | Thompson |
| 5,559,800 A | 9/1996 | Mousseau et al. |
| 5,564,016 A | 10/1996 | Korenshtein |
| 5,564,070 A | 10/1996 | Want et al. |
| 5,566,225 A | 10/1996 | Haas |
| 5,568,645 A | 10/1996 | Morris et al. |
| 5,572,528 A | 11/1996 | Shuen |
| 5,574,774 A | 11/1996 | Ahlberg et al. |
| 5,586,257 A | 12/1996 | Perlman |
| 5,592,549 A | 1/1997 | Nagel et al. |
| 5,594,490 A | 1/1997 | Dawson et al. |
| 5,602,916 A | 2/1997 | Grube et al. |
| 5,604,490 A | 2/1997 | Blakley et al. |
| 5,610,595 A | 3/1997 | Garrabrant et al. |
| 5,623,600 A | 4/1997 | Ji et al. |
| 5,623,601 A | 4/1997 | Vu |
| 5,627,821 A | 5/1997 | Miyagi |
| 5,627,892 A | 5/1997 | Kauffman |
| 5,633,868 A | 5/1997 | Baldwin et al. |
| 5,638,358 A | 6/1997 | Hagi |
| 5,638,513 A | 6/1997 | Ananda |
| 5,652,789 A | 7/1997 | Miner et al. |
| 5,657,390 A | 8/1997 | Elgamal et al. |
| 5,664,007 A | 9/1997 | Samadi et al. |
| 5,666,501 A | 9/1997 | Jones et al. |
| 5,668,999 A | 9/1997 | Gosling |
| 5,671,354 A | 9/1997 | Ito et al. |
| 5,673,322 A | 9/1997 | Pepe et al. |
| 5,682,534 A | 10/1997 | Kapoor et al. |
| 5,689,708 A | 11/1997 | Regnier et al. |
| 5,717,737 A | 2/1998 | Doviak |
| 5,721,818 A | 2/1998 | Hanif et al. |
| 5,724,346 A | 3/1998 | Kobayashi et al. |
| 5,729,734 A | 3/1998 | Parker et al. |
| 5,732,074 A | 3/1998 | Spaur |
| 5,737,416 A | 4/1998 | Cooper et al. |
| 5,742,757 A | 4/1998 | Hamadani et al. |
| 5,748,897 A | 5/1998 | Katiyar |
| 5,752,185 A | 5/1998 | Ahuja |
| 5,754,774 A | 5/1998 | Bittinger et al. |
| 5,758,186 A | 5/1998 | Hamilton et al. |
| 5,768,525 A | 6/1998 | Kralowetz et al. |
| 5,771,459 A | 6/1998 | Demery et al. |
| 5,784,643 A | 7/1998 | Shields |
| 5,794,207 A | 8/1998 | Walker et al. |
| 5,796,727 A | 8/1998 | Harrison et al. |
| 5,812,671 A | 9/1998 | Ross |
| 5,812,784 A | 9/1998 | Watson et al. |
| 5,848,064 A | 12/1998 | Cowan |
| 5,856,974 A | 1/1999 | Gervais et al. |
| 5,889,816 A | 3/1999 | Agrawal et al. |
| 5,909,431 A | 6/1999 | Kuthyar et al. |
| 5,923,756 A | 7/1999 | Shambroom |
| 5,933,412 A | 8/1999 | Choudhury et al. |
| 5,935,212 A | 8/1999 | Kalajan et al. |
| 5,944,791 A | 8/1999 | Scherpbier |
| 5,956,407 A | 9/1999 | Slavin |
| 5,968,176 A | 10/1999 | Nessett et al. |
| 5,987,611 A | 11/1999 | Freund |
| 6,006,090 A | 12/1999 | Coleman et al. |
| 6,023,724 A | 2/2000 | Bhatia et al. |
| 6,055,575 A | 4/2000 | Paulsen et al. |
| 6,058,250 A | 5/2000 | Harwood et al. |
| 6,058,480 A | 5/2000 | Brown |
| 6,085,247 A | 7/2000 | Parsons et al. |
| 6,088,451 A | 7/2000 | He et al. |
| 6,091,951 A | 7/2000 | Sturniolo et al. |
| 6,094,423 A | 7/2000 | Alfano et al. |
| 6,101,543 A | 8/2000 | Alden et al. |
| 6,112,085 A | 8/2000 | Garner et al. |
| 6,131,116 A | 10/2000 | Riggins et al. |
| 6,145,109 A | 11/2000 | Schuster et al. |
| 6,147,986 A | 11/2000 | Orsic |
| 6,154,461 A | 11/2000 | Sturniolo et al. |
| 6,161,123 A | 12/2000 | Renouard et al. |
| 6,166,729 A | 12/2000 | Acosta et al. |
| 6,167,513 A | 12/2000 | Inoue et al. |
| 6,169,992 B1 | 1/2001 | Beall et al. |
| 6,170,057 B1 | 1/2001 | Inoue et al. |
| 6,170,075 B1 | 1/2001 | Schuster et al. |
| 6,198,920 B1 | 3/2001 | Doviak et al. |
| 6,199,113 B1 | 3/2001 | Alegre et al. |
| 6,201,962 B1 | 3/2001 | Sturniolo et al. |
| 6,226,618 B1 | 5/2001 | Downs et al. |
| 6,226,750 B1 | 5/2001 | Trieger |
| 6,226,769 B1 | 5/2001 | Schuster et al. |
| 6,230,004 B1 | 5/2001 | Hall et al. |
| 6,233,617 B1 | 5/2001 | Rothwein et al. |
| 6,233,619 B1 | 5/2001 | Narisi et al. |
| 6,236,652 B1 | 5/2001 | Preston et al. |
| 6,240,514 B1 | 5/2001 | Inoue et al. |
| 6,243,753 B1 | 6/2001 | Machin et al. |
| 6,249,818 B1 | 6/2001 | Sharma |
| 6,256,739 B1 | 7/2001 | Skopp et al. |
| 6,266,418 B1 | 7/2001 | Carter et al. |
| 6,269,402 B1 | 7/2001 | Lin et al. |
| 6,289,461 B1 | 9/2001 | Dixon |
| 6,308,281 B1 | 10/2001 | Hall, Jr. et al. |
| 6,336,135 B1 | 1/2002 | Niblett et al. |
| 6,349,337 B1 | 2/2002 | Parsons et al. |
| 6,360,265 B1 | 3/2002 | Falck et al. |
| 6,415,329 B1 | 7/2002 | Gelman et al. |
| 6,418,324 B1 | 7/2002 | Doviak et al. |
| 6,421,768 B1 | 7/2002 | Purpura |
| 6,449,651 B1 | 9/2002 | Dorfman et al. |
| 6,484,206 B2 * | 11/2002 | Crump et al. ............... 709/227 |
| 6,487,690 B1 | 11/2002 | Schuster et al. |
| 6,496,520 B1 | 12/2002 | Acosta |
| 6,502,144 B1 | 12/2002 | Accarie |
| 6,505,241 B2 | 1/2003 | Pitts |

| | | | |
|---|---|---|---|
| 6,546,425 B1 | 4/2003 | Hanson et al. | |
| 6,560,650 B1 | 5/2003 | Imai | |
| 6,564,320 B1 | 5/2003 | de Silva et al. | |
| 6,574,239 B1 | 6/2003 | Dowling et al. | |
| 6,605,241 B2 | 8/2003 | Asakawa et al. | |
| 6,606,708 B1 | 8/2003 | Shoulberg et al. | |
| 6,609,198 B1 | 8/2003 | Wood et al. | |
| 6,611,522 B1 | 8/2003 | Zheng et al. | |
| 6,671,729 B1 | 12/2003 | Gordon et al. | |
| 6,681,017 B1 | 1/2004 | Matias et al. | |
| 6,691,232 B1 | 2/2004 | Wood et al. | |
| 6,697,377 B1 | 2/2004 | Ju et al. | |
| 6,714,536 B1 | 3/2004 | Dowling | |
| 6,725,376 B1 | 4/2004 | Sasmazel et al. | |
| 6,826,696 B1 | 11/2004 | Chawla et al. | |
| 6,832,260 B2 | 12/2004 | Brabson et al. | |
| 6,845,387 B1 | 1/2005 | Prestas et al. | |
| 6,857,071 B1 | 2/2005 | Nakae | |
| 6,874,086 B1 | 3/2005 | Gu et al. | |
| 6,993,652 B2 | 1/2006 | Medvinsky | |
| 6,996,631 B1 | 2/2006 | Aiken et al. | |
| 7,010,300 B1* | 3/2006 | Jones et al. | 455/439 |
| 7,212,962 B2* | 5/2007 | Masushige et al. | 703/24 |
| 2001/0037464 A1 | 11/2001 | Persels | |
| 2001/0056547 A1 | 12/2001 | Dixon | |
| 2002/0010866 A1 | 1/2002 | McCullough et al. | |
| 2002/0029340 A1 | 3/2002 | Pensak et al. | |
| 2002/0035699 A1 | 3/2002 | Crosbie | |
| 2002/0098840 A1 | 7/2002 | Hanson et al. | |
| 2002/0115407 A1 | 8/2002 | Thompson et al. | |
| 2002/0116642 A1 | 8/2002 | Joshi et al. | |
| 2002/0142774 A1 | 10/2002 | Saint-Hilaire et al. | |
| 2002/0164952 A1 | 11/2002 | Singhal et al. | |
| 2002/0165990 A1 | 11/2002 | Singhal et al. | |
| 2002/0178211 A1 | 11/2002 | Singhal et al. | |
| 2002/0194473 A1 | 12/2002 | Pope et al. | |
| 2003/0018913 A1 | 1/2003 | Brezak et al. | |
| 2003/0043844 A1 | 3/2003 | Heller | |
| 2003/0069803 A1 | 4/2003 | Pollitt | |
| 2003/0078983 A1 | 4/2003 | Sullivan et al. | |
| 2003/0078985 A1 | 4/2003 | Holbrook et al. | |
| 2003/0093691 A1 | 5/2003 | Simon et al. | |
| 2003/0117992 A1 | 6/2003 | Kim et al. | |
| 2003/0120811 A1 | 6/2003 | Hanson et al. | |
| 2003/0163569 A1 | 8/2003 | Panasyuk et al. | |
| 2003/0233554 A1 | 12/2003 | Litai et al. | |
| 2004/0258003 A1 | 12/2004 | Kokot et al. | |
| 2005/0002417 A1* | 1/2005 | Kelly et al. | 370/466 |
| 2005/0015507 A1* | 1/2005 | Chin | 709/230 |
| 2005/0144186 A1 | 6/2005 | Hesselink et al. | |
| 2005/0149481 A1 | 7/2005 | Hesselink et al. | |
| 2005/0220086 A1 | 10/2005 | Dowling | |

FOREIGN PATENT DOCUMENTS

| | | |
|---|---|---|
| EP | 0 483 547 A1 | 5/1992 |
| EP | 0 483 551 A2 | 5/1992 |
| EP | 0 643 514 A2 | 3/1995 |
| EP | 0 679 980 A1 | 11/1995 |
| EP | 0 734 144 A2 | 9/1996 |
| EP | 0 851 628 A1 | 7/1998 |
| EP | 0 575 765 B1 | 10/1999 |
| EP | 1 351 467 | 10/2003 |
| GB | 2 168 831 A | 6/1986 |
| JP | 2000125029 A | 4/2000 |
| WO | WO 92/19059 A1 | 10/1992 |
| WO | WO 94/14114 | 6/1994 |
| WO | WO 94/28670 | 12/1994 |
| WO | WO 97/18635 | 5/1997 |
| WO | WO 98/52344 | 11/1998 |
| WO | WO 99/66675 | 12/1999 |
| WO | WO 99/66762 | 12/1999 |
| WO | WO 00/72506 A1 | 11/2000 |
| WO | WO 02/23362 A1 | 3/2002 |

OTHER PUBLICATIONS

Alexander, S. et al. "DHCP Options and BOOTP Vendor Extensions." retrieved from the internet at http://www.ietf.org/rfc/rfc2132.txt?number=2132, 29 pp., Mar. 1997.

Bakre, A. et al. "I-TCP: Indirect TCP for Mobile Hosts." Document DCS-TR-314, pp. 1-18, Rutgers University, Piscataway, New Jersey, Oct. 1994.

Berners-Lee, T. et al. "Hypertext transfer protocol—HTTP/1.0" downloaded from the internet at http://www.w3.org/Protocols/rfc1945/rfc1945, pp. 1-60, May 1996.

Datability Software Systems, Inc. "Proposal Presented to Digital Equipment Corporation Large Systems Group, Marlboro, Massachusetts Jul. 7, 1983." 13 pp., 1983.

Droms, R. "Dynamic Host Configuration Protocol" retrieved from the internet at http://www.ietf.org/rfc/rfc2131.txt, 38 pp., 1997.

Information Sciences Institute "Transmission Control Protocol: DARPA Internet Program Protocol Specification." 85 pp., 1981.

International Business Machines Corporation "ARTour." 4 pp., 1995.

International Search Report to PCT/US2004/033334 (Jan. 5, 2005) 7 pages.

International Search Report to PCT/US2004/033794 (Jan. 20, 2005) 8 pages.

International Search Report to PCT/US2004/033333 (Jan. 17, 2005) 7 pages.

Ioannidis, J. et al. "IP-based protocols for mobile internetworking" In Proceedings of the ACM SIGCOMM Symposium on Communications, Architectures and Protocols, pp. 235-245, Sep. 1991.

Ioannidis, J. et al. "Protocols for supporting mobile IP hosts." Internet Draft, retrieval address unknown, 48 pp., Jun. 1992.

Ioannidis, J. et al. "The Design and Implementation of a Mobile Internetworking Architecture." 1993 Winter USENIX, Jan. 1993.

Kiiskinen, J. et al. "Data channel service for wireless telephone links." Publication C-1996-1, pp. 1-17, University of Helsinki, Department of Computer Science, Helsinki, 1996.

Kojo, M. et al. "Connecting mobile workstations to the internet over a digital cellular telephone network." Publication C-1994-39, pp. 1-16, University of Helsinki, Department of Computer Science, Helsinki, 1994.

Kojo, M. et al. "Enhanced communication services for mobile TCP/IP networking." Publication C-1995-15, pp. 1-22, University of Helsinki, Department of Computer Science, Helsinki, 1995.

Laamanen, H. "An experiment of dependability and performance of GSM access to fixed data network." Publication C-1995-41, pp. 1-21, University of Helsinki, Department of Computer Science, Helsinki, 1995.

Liljeberg, M. et al. "Enhanced services for world-wide web in mobile WAN environment." Publication C-1996-28, pp. 1-12, University of Helsinki, Deapartment of Computer Science, Helsinki, 1996.

Liljeberg, M. et al. "Optimizing world-wide web for weakly connected mobile workstations: an indirect approach." 8pp., in Proc. 2nd International Workshop on Services in Distributed and Networked Environments (SDNE), Whistler, Canada, Jun. 1995.

M3I Systems, Inc. "M3i RadioLink (management through instant interactive information): Overview." 7pp., 1995.

Maltz, D. et al. "MSOCKS: an architecture for transport layer mobility.", 9 pp. in Proceedings of the IEEE INFOCOM '98, 1998.

Milligan, T. "iiif, The Integrated Interactive Intermedia Facility Design Report—CAVECAT Revision 1.2.2", 22 pp. Dynamic Graphics Project, University of Toronto, Toronto, 1991.

Montenegro, G. "Reverse Tunneling for Mobile IP," draft-ietf-mobileip-tunnel-reverse-00.txt, 15pp., retrieved from the internet at hegel.ittc.ukans.edu/topics/internet/internet-drafts/draft-i/draft-ietf-mobileip-firewall-trav-00.txt, Jan. 1997.

NetMotion Wireless "Netmotion wireless product documentation." 3 pp., retrieved from the internet at http://www.netmotionwireless.com/support/manuals, 2002.

Nodes Group "MOWGLI: Mobile Office Workstations using GSM Links" 3 pp., retrieved from the internet at http://www.cs.helsinki.fi/research/mowgli/, 2000.

PADCom, Inc. "Connectivity Suite Technical Overview." pp. i-ii, 1-40, Padcom, Inc., Bethlehem, PA, 2001.

Pankoke-Babatz, U. "1984/1988 X.400 recommendations—user requirements." Computer Communications 13(10):595-610, 1990.

Perkins, C.E. "Mobile networking through mobile IP." 15 pp., retrieved from the internet at www.computer.org/internet/v2n1/perkins.htm, Internet Computing Online, 1997.

Perkins, C.E. et al. "DHCP for mobile networking with TCP/IP." IEEE Symposium on Computers and Communications, p. 255-61, +1995.

Piscitello, D. et al. "Mobile Network Computing Protocol (MNCP)", 28 pp., retrieved from the internet at http://www.watersprings.org/pub/id/draft-piscitello-mncp-00.txt, 1997.

Postel, J., et al. "File Transfer Protocol (FTP)" IETF RFC 765, Oct. 1985.

Sun Microsystems, Inc. "RPC: Remote Procedure Call Protocol Specification Version 2" IETF RFC 1050, Jun. 1988.

TEKnique "Optimized TCP/IP over wireless" 5 pp. (publication date unknown).

TEKnique "TransNet II Wireless Gateway Services" 2 pp. (publication date unknown).

TEKnique "Transnet II: Wireless gateway." 3 pp., (publication date unknown).

TEKnique "TransRMail" 2pp. (publication date unknown).

TEKnique "TX1000" 2 pp., 1994.

TEKnique "TX2000" 2 pp. (publication date unknown).

TEKnique "TX5000" 2 pp., 1994.

Teraoka, F. et al. "A Network Architecture Providing Host Migration Transparency." In Proceedings of the ACM SIGCOMM Symposium on Communications, Architectures and Protocols, pp. 209-220, Sep. 1991.

Weiser, M. "Some computer science issues in ubiquitous computing" pp. 75-85 Communications of the ACM, Jul. 1993.

WRQ, Inc. "AtGuard Getting Started Guide." 6 pp. retrieved from the internet at http://www.atgyard.com/help/docs/guide/html (publication date unknown).

WRQ, Inc. "Glossary."8pp. retreived from the internet at http://www.atguard.com/product_info/features.html (publication date unknown).

WRQ, Inc. "Tour of AtGuard's features."8pp. retreived from the internet at http://www.atguard.com/product_info/features.html (publication date unknown).

WRQ, Inc. "WRQ licenses ATGuard to Symantec and ASCII Network Technology." 1 p. retreived from the internet at http://www.atguard.com/press_area/Welcome.html, 1999.

Written Opinion of the International Searching Authority to PCT/US2004/033334 (Oct. 8, 2004) 5 pages.

Written Opinion of the International Searching Authority to PCT/US2004/0033794 (Oct. 12, 2004) 6 pages.

Written Opinion of the International Searching Authority to PCT/US2004/033333 (Oct. 8, 2004) 7 pages.

"Network Neighborhood" http://www.internet.com, © 1999, internet.com.

Allison, et al. "File System Security: Secure Network Data Sharing for NT and UNIX" Network Appliance, Inc., Tecj Library, Jan. 16, 1998 pp. 1-16 (double-sided).

B. Clifford Neuman, "Proxy-Based Authorization and Accounting for Distributed Systems" © IEEE, May 25, 1993, pp. 283-291.

Charles Seife, "Algorithmic Gladiators Vie for Digital Glory" www.sciencemag.org, Science, vol. 288, May 19, 2000, pp. 1161 & 1163.

Dave Otway and Owen Rees, "Efficient and Timely Mutual Authentication" the ANSA Project, 24 Hills Road, Cambridge CB21JP United Kingdom, pp. 8-10.

Howard Millman, "Give Your Computer the Finger" Computerworld, Mar. 27, 2000.

IBM: "IBM Operating System/2 Version 1.2 Profile Validation Hooks" pp. 1-26, Nov. 22, 1989.

International Search Report for PCT/US02/18295 (6 pages).

International Search Report for PCT/US03/05475 (4 pages).

Lawerence C. Paulson, "Mechanized Proofs for a Recursive Authentication Protocol" Computer Laboratory, University of Cambridge, Pembroke Street, Cambridge CB2 3QG, England, pp. 84-94.

Li Gong, "Using One-Way Functions for Authentication" University of Cambridge Computer Laboratory, Cambridge CB2 3QG, England Jul. 1989, pp. 8-11.

Mark Nicholson, "How to hold mobile users to account" Financial Times, Tuesday, May 2, 2000.

N.F. Maxemchuk, S. Low, "The Use of Communications Networks To Increase Personal Privacy" from IEEE INFOCOM '95, Proceedings, vol. 2, Apr. 2-6, 1995, pp. 504-512.

P.Y.A. Ryan, S.A. Schneider, "An attack on a recursive authentication protocol; A cautionary tale" Information Proceesing Letters 65, 1998 Elsevier Science, B.V., pp. 7-10.

Russel Kay, "Authentication" Computerworld, Mar. 27, 2000, pp. 77-79.

Tom Yager, "OS Paradise" BYTE, Nov. 1995.

Tony Savvas, "Handset giants launch security system" www.computerweekly.com.

Win95 Tutorial: Index of Topics, http://orion.valencia.cc.fl.us/tutprials/Win95demo.net.html, printed Dec. 27, 1999, 2 pages.

Written Opinion of the International Searching Authority to PCT/US02/018295 (Aug. 23, 2003), 5 pages.

* cited by examiner

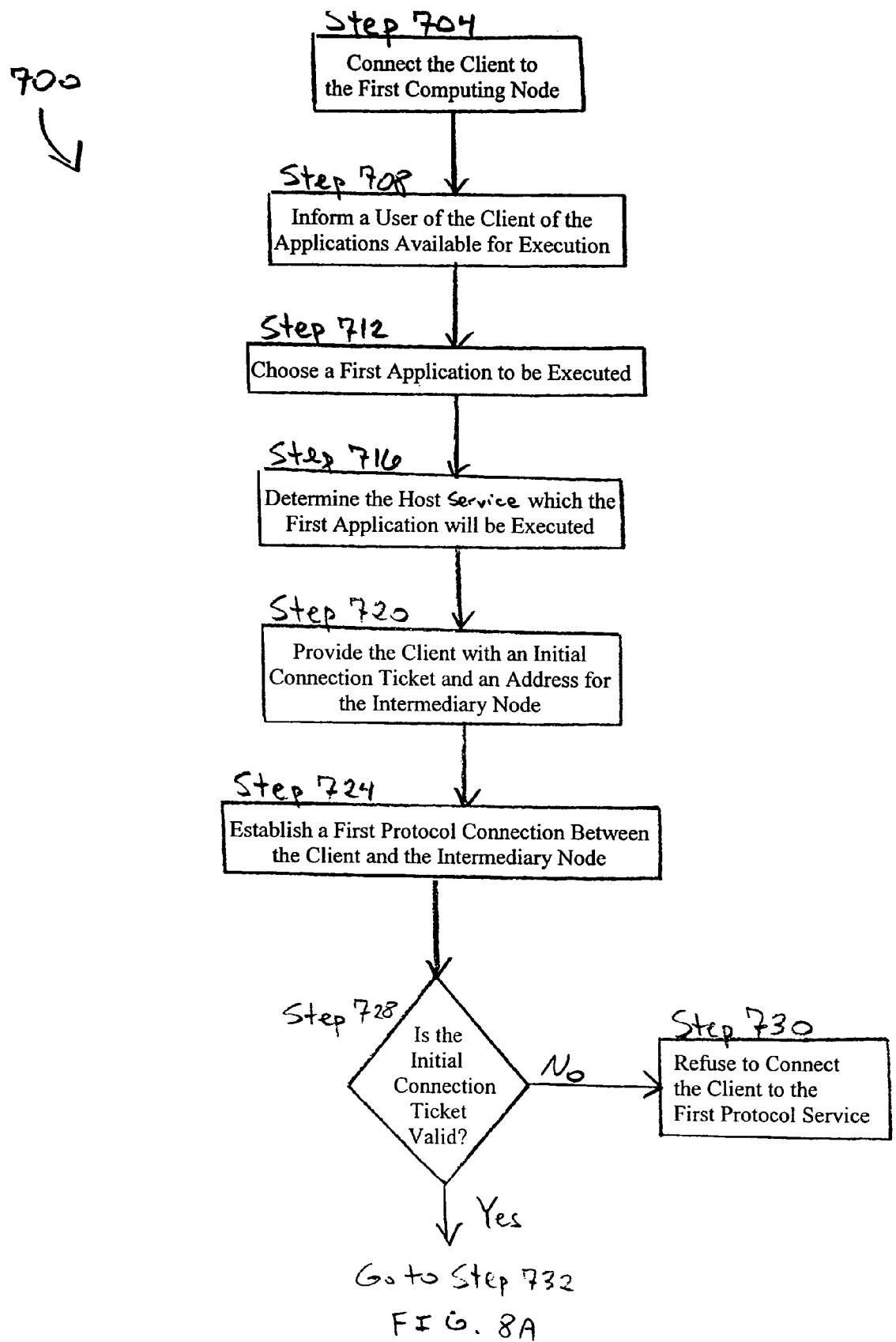

ENCAPSULATING PROTOCOL FOR SESSION PERSISTENCE AND RELIABILITY

TECHNICAL FIELD

The invention generally relates to network communications. More particularly, the invention relates to a communication protocol that encapsulates other protocols and thereby provides session persistence and reliability.

BACKGROUND INFORMATION

Communications over a network between two computers, for example a client and a server, can be implemented using a variety of known communication protocols. Often, however, the network connection is susceptible to breakdown. A wireless connection between a client and a server, for example, is often unreliable. In other cases, the network connection is intermittent. For example, a connection can be lost when one enters an elevator or tunnel and may only be capable of being restored following one's exit from the elevator or tunnel.

When communicating over a network connection using many current protocols, data packets are lost when the network connection is disrupted. For example, when many current protocols are communicated over a standard TCP network connection, data buffers are typically flushed upon disruption of the connection. As such, when the network connection is restored, a networked application, for example, is unable to resume from where it was prior to disruption. Typically an error message is displayed, adding user frustration to inconvenience.

Moreover, communicating over a network with many current protocols often requires frequent tear down and re-establishment of the transport connection. For example, using HTTP, either on its own or in conjunction with typical proxy protocols, to browse a website over a standard TCP connection requires, in addition to a new HTTP connection for each resource, the closure of a previous TCP/proxy protocol connection and the opening of a new TCP/proxy protocol connection for each resource.

Furthermore, when a network connection fails, one must typically restart and completely re-logon to the server before communications can resume. For example, logon credentials need to be re-applied. Often, this is a slow process that also results in user inefficiency.

Improved systems and methods for network communications are, therefore, needed.

SUMMARY OF THE INVENTION

The present invention relates to systems and methods for providing a client with a reliable connection to a host service. A first communication protocol, capable of encapsulating secondary protocols used in communications between the client and the host service, ensures that data is maintained during a disrupted network connection. More specifically, data communicated between the client and the host service is buffered. When, for example, a client, such as a mobile client, roams between different access points in the same network, the buffered data is maintained during the temporarily disrupted network connection. Similarly, in another example, when a client switches between networks (e.g., from a wired network to a wireless network) the buffered data is maintained during the temporarily disrupted connection to the host service. In addition to maintaining buffered data when a client roams between network access points or between networks themselves, buffered data can also be maintained, for example, when the network connection is disrupted due to a failure of a server side component (e.g., a failure of a server side proxy), due to a time-out in the system, or due to other reasons. Accordingly, session persistence is achieved and reliability ensured.

Using the first communication protocol of the present invention also allows the secondary protocol connections tunneled therein to be opened and/or closed, repetitively, without also requiring the transport connection over which the first protocol is communicated, or the first protocol connection itself, to similarly be repetitively opened and/or closed. As such, the efficiency of the system is improved.

Moreover, the present invention relates to systems and methods for re-connecting a client to a host service following a disruption to a network connection. More particularly, the systems and methods for re-connecting the client to the host service use re-connection tickets and do not require the re-application of user logon credentials. As such, the time needed to re-connect the client to the host service is reduced.

In one aspect, the invention generally relates to a method for network communications. The method includes establishing a first connection between a client and a first protocol service using a first protocol and communicating between the client and the first protocol service via a plurality of secondary protocols encapsulated within the first protocol. Moreover, at least one of the secondary protocols includes a plurality of virtual channels.

In one embodiment of this aspect of the invention, a second connection is established between the first protocol service and a host service using one of the secondary protocols. Communication between the first protocol service and the host service occurs via one of the secondary protocols. In another embodiment, a plurality of second connections are established between the first protocol service and a plurality of host services using the plurality of the secondary protocols. Specifically, each of the plurality of second connections is established between the first protocol service and a different host service and each of the plurality of second connections is established using one of the plurality of secondary protocols. Communication between the first protocol service and the plurality of host services occurs over each of the plurality of second connections via one of the plurality of secondary protocols. In yet another embodiment, the first connection between the client and the first protocol service is established through an intermediary node.

The first protocol can be communicated over TCP/IP and the secondary protocol can be, for example, HTTP, RDP, ICA, FTP, Oscar, or Telnet. Additionally, each virtual channel can include a plurality of protocol packets that enable remote access functionality.

In one embodiment, the communications are compressed at the level of the first protocol. In another embodiment, the communications are encrypted at the level of the first protocol. In yet another embodiment, the first connection is secure, a second connection between the first protocol service and a first host service is established, the client and the first host service communicate via the first connection and the second connection, the second connection is broken, a third connection between the first protocol service and a second host service is established without interrupting the first connection, and the client and the second host service communicate via the first connection and the third connection.

In another aspect, the invention relates to a method for providing a client with a reliable connection to a host service. The method includes establishing a first connection between the client and a first protocol service using a first protocol and establishing a second connection between the first protocol service and the host service using a secondary protocol. The first protocol is for encapsulating a plurality of secondary protocols. The method further includes maintaining a queue of data packets most recently transmitted via the first connection on at least one of the client and the first protocol service. Upon failure of the first connection: the second connection is maintained, the queue of data packets most recently transmitted via the first connection is still maintained, and a third connection is established between the client and the first protocol service using the first protocol.

In one embodiment of this aspect of the invention, at least one of the queued data packets is transmitted via the third connection.

In another aspect, the invention provides a method for re-connecting a client to a host service. The method includes providing a first connection between the client and an intermediary node, a second connection between the intermediary node and a first protocol service, and a third connection between the first protocol service and the host service. A disruption is detected in at least one of the first connection and the second connection. The first connection between the client and the intermediary node is re-established while the third connection between the first protocol service and the host service is maintained. A first ticket and a second ticket are also received at the intermediary node. The first ticket is validated. After the first ticket is validated, the second connection between the intermediary node and the first protocol service is re-established. The second ticket is validated and, after the second ticket is validated, the re-established second connection is linked to the maintained third connection.

In one embodiment of this aspect of the invention, the method includes interrupting, after the disruption in at least one of the first connection and the second connection is detected, any remaining connections of the first connection and the second connection.

In another embodiment, the first ticket is transmitted from the intermediary node to a ticket authority and the first ticket is validated using the ticket authority. After the first ticket is validated, an address for the first protocol service is received at the intermediary node. Moreover, the first ticket can be deleted after it is validated. After the first ticket is deleted, a replacement first ticket can be generated.

In yet another embodiment, the second ticket is transmitted from the intermediary node to the first protocol service and the second ticket is validated using the first protocol service. The second ticket can be deleted after it is validated. After the second ticket is deleted, a replacement second ticket can be generated.

In still another embodiment, the intermediary node can transmit to the ticket authority a request for the first ticket. The first ticket, which can be, for example, a random number, can be generated at the ticket authority. The ticket authority can also generate a handle and save, at the ticket authority, a copy of the first ticket, a copy of the handle, and an address for the first protocol service. The first ticket and the handle can be transmitted from the ticket authority to the intermediary node, which can then transmit the first ticket to the client. The handle can also be used to delete the copy of the first ticket saved at the ticket authority.

In a further embodiment, the second ticket, which can be, for example, a random number, can be generated at the first protocol service. A copy of the second ticket and a session number can also be saved at the at the first protocol service. The second ticket can be transmitted from the first protocol service to the client. Additionally, at least one of the first ticket and the second ticket can be automatically deleted after a pre-determined period of time.

In another aspect, the invention provides a method for re-connecting a client to a host service. The method includes providing a first connection between the client and a first intermediary node, a second connection between the first intermediary node and a first protocol service, and a third connection between the first protocol service and the host service. A disruption is detected in at least one of the first connection and the second connection. A fourth connection between the client and a second intermediary node, which is different from the first intermediary node, is established while the third connection between the first protocol service and the host service is maintained. A first ticket and a second ticket are also received at the second intermediary node. The first ticket is validated. After the first ticket is validated, a fifth connection between the second intermediary node and the first protocol service is established. The second ticket is validated and, after the second ticket is validated, the established fifth connection is linked to the maintained third connection.

In another aspect, the invention provides a method for re-connecting a client to a host service. The method includes providing a first connection between the client and a first protocol service, and a second connection between the first protocol service and the host service. A disruption is detected in the first connection. The first connection between the client and the first protocol service is re-established while the second connection between the first protocol service and the host service is maintained. A ticket is also received at the first protocol service. The ticket is validated. After the ticket is validated, the re-established first connection is linked to the maintained second connection.

In one embodiment of this aspect of the invention, the ticket, after it is validated, is deleted. Moreover, after the ticket is deleted, a replacement ticket can be generated. In another embodiment, the ticket, which can be a random number, is generated at the first protocol service. A copy of the ticket and a session number can be saved at the first protocol service. The ticket can also be transmitted from the first protocol service to the client. Additionally, the ticket can be automatically deleted after a pre-determined period of time.

In another aspect, the invention generally relates to a system for network communications. The system includes a first protocol service configured to accept a first connection with a client and communicate with the client via a plurality of secondary protocols encapsulated within a first protocol. Moreover, at least one of the secondary protocols includes a plurality of virtual channels.

In one embodiment of this aspect of the invention, the first protocol service is further configured to establish a second connection with a host service and communicate with the host service via one of the secondary protocols. In another embodiment, the first protocol service is further configured to establish a plurality of second connections with a plurality of host services using the plurality of secondary protocols. Specifically, each of the plurality of second connections is established with a different host service and each of the plurality of second connections is established using one of the plurality of secondary protocols. In such an embodiment, the first protocol service is further configured to communicate with the plurality of host services over each of the plurality of second connections via one of the plurality of secondary protocols. In yet another embodiment, the first connection with the client is routed through an intermediary node.

The first protocol can be communicated over TCP/IP and the secondary protocol can be, for example, HTTP, RDP, ICA, FTP, Oscar, or Telnet. Additionally, each virtual channel can include a plurality of protocol packets that enable remote access functionality.

In one embodiment, the first protocol service is configured to compress the communications at the level of the first protocol. In another embodiment, the first protocol service is configured to encrypt the communications at the level of the first protocol. In yet another embodiment, the first connection is secure, and the first protocol service is configured to establish a second connection with a first host service, interrupt the second connection, and establish a third connection with a second host service without interrupting the first connection.

In another aspect, the invention relates to a system for providing a client with a reliable connection to a host service. The system includes a first protocol service and the host service. The first protocol service is configured to accept a first connection with the client, establish a second connection with the host service, and, upon failure of the first connection,: maintain the second connection and accept a third connection from the client. The host service is configured to accept the second connection with the first protocol service and, upon failure of the first connection, maintain the second connection. The first connection and the third connection are each established using a first protocol, which can encapsulate a plurality of secondary protocols. Moreover, at least one of the client and the first protocol service is further configured to maintain, before and upon failure of the first connection, a queue of data packets most recently transmitted via the first connection.

In one embodiment of this aspect of the invention, the client is further configured to transmit at least one of the queued data packets via the third connection. Alternatively, the first protocol service can be configured to transmit at least one of the queued data packets via the third connection.

In another aspect, the invention provides a system for re-connecting a client to a host service. The system includes the client, an intermediary node, and a first protocol service. The client is configured to maintain a first connection with the intermediary node. For its part, the intermediary node is configured to maintain the first connection with the client and a second connection with the first protocol service. The first protocol service is configured to maintain the second connection with the intermediary node and a third connection with the host service. In accordance with this system, a disruption is detected in at least one of the first connection and the second connection, the first connection is re-established between the client and the intermediary node while the third connection between the first protocol service and the host service is maintained, a first ticket and a second ticket are transmitted from the client to the intermediary node, the first ticket is validated, the second connection between the intermediary node and the first protocol service is re-established after the first ticket is validated, the second ticket is validated, and, after the second ticket is validated, the re-established second connection is linked to the maintained third connection.

In one embodiment of this aspect of the invention, after the disruption in at least one of the first connection and the second connection is detected, any remaining connections of the first connection and the second connection are broken.

In another embodiment, the first ticket is validated using a ticket authority. The ticket authority is, for example, configured to receive the first ticket from the intermediary node and validate the first ticket. In one embodiment, the intermediary node is further configured to receive, after the first ticket is validated, an address for the first protocol service. The ticket authority can be configured to delete the first ticket after it is validated. Moreover, the ticket authority can be configured to generate, after the first ticket is deleted, a replacement first ticket.

In another embodiment, the second ticket is validated using the first protocol service. The first protocol service is, for example, configured to receive the second ticket from the intermediary node and validate the second ticket. The first protocol service can be configured to delete the second ticket after it is validated. Moreover, the first protocol service can be configured to generate, after the second ticket is deleted, a replacement second ticket.

In still another embodiment, the intermediary node is configured to transmit a request for the first ticket to the ticket authority. The ticket authority can be configured to generate the first ticket, which can be, for example, a random number. The ticket authority can also be configured to generate a handle and to save a copy of the first ticket, a copy of the handle, and an address for the first protocol service. The ticket authority can be configured to transmit the first ticket and the handle to the intermediary node, which can be configured to then transmit the first ticket to the client. The intermediary node can also be configured to use the handle to delete the copy of the first ticket saved at the ticket authority.

In a further embodiment, the first protocol service can be configured to generate the second ticket, which can be, for example, a random number. The first protocol service can also be configured to save a copy of the second ticket and a session number. In another embodiment, the first protocol service is configured to transmit the second ticket to the client. Additionally, at least one of the first ticket and the second ticket can be configured for automatic deletion after a pre-determined period of time.

In another aspect, the invention provides a system for re-connecting a client to a host service. The system includes the client, a first intermediary node, a first protocol service, and a second intermediary node, which is different from the first intermediary node. The client is configured to maintain a first connection with the first intermediary node. For its part, the first intermediary node is configured to maintain the first connection with the client and a second connection with the first protocol service. The first protocol service is configured to maintain the second connection with the first intermediary node and a third connection with the host service. In accordance with this system, a disruption is detected in at least one of the first connection and the second connection, a fourth connection is established between the client and a second intermediary node while the third connection between the first protocol service and the host service is maintained, a first ticket and a second ticket are transmitted from the client to the second intermediary node, the first ticket is validated, a fifth connection between the second intermediary node and the first protocol service is established after the first ticket is validated, the second ticket is validated, and, after the second ticket is validated, the established fifth connection is linked to the maintained third connection.

In another aspect, the invention provides a system for re-connecting a client to a host service. The system includes the client and a first protocol service. The client is configured to maintain a first connection with the first protocol service. For its part, the first protocol service is configured to maintain the first connection with the client and a second connection with the host service. In accordance with this system, a disruption is detected in the first connection, the first connection is re-established between the client and the first protocol service while the second connection between the first protocol service and the host service is maintained, a ticket is transmitted from the client to the first protocol service, the ticket is validated, and, after the ticket is validated, the re-established first connection is linked to the maintained second connection.

In one embodiment of this aspect of the invention, the first protocol service is further configured to delete, after the ticket is validated, the ticket. Moreover, the first protocol service can be further configured to generate, after the ticket is deleted, a replacement ticket. In another embodiment, the first protocol service is further configured to generate the ticket, which can be, for example, a random number. The first protocol service can be configured to save a copy of the ticket and a session number. The first protocol service can also be configured to transmit the ticket to the client. Additionally, the ticket can be configured for automatic deletion after a predetermined period of time.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIGS. 8A-8C are flow diagrams of a method for connecting a client to a plurality of host services according to an illustrative embodiment of the invention;

DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Figure 1A:
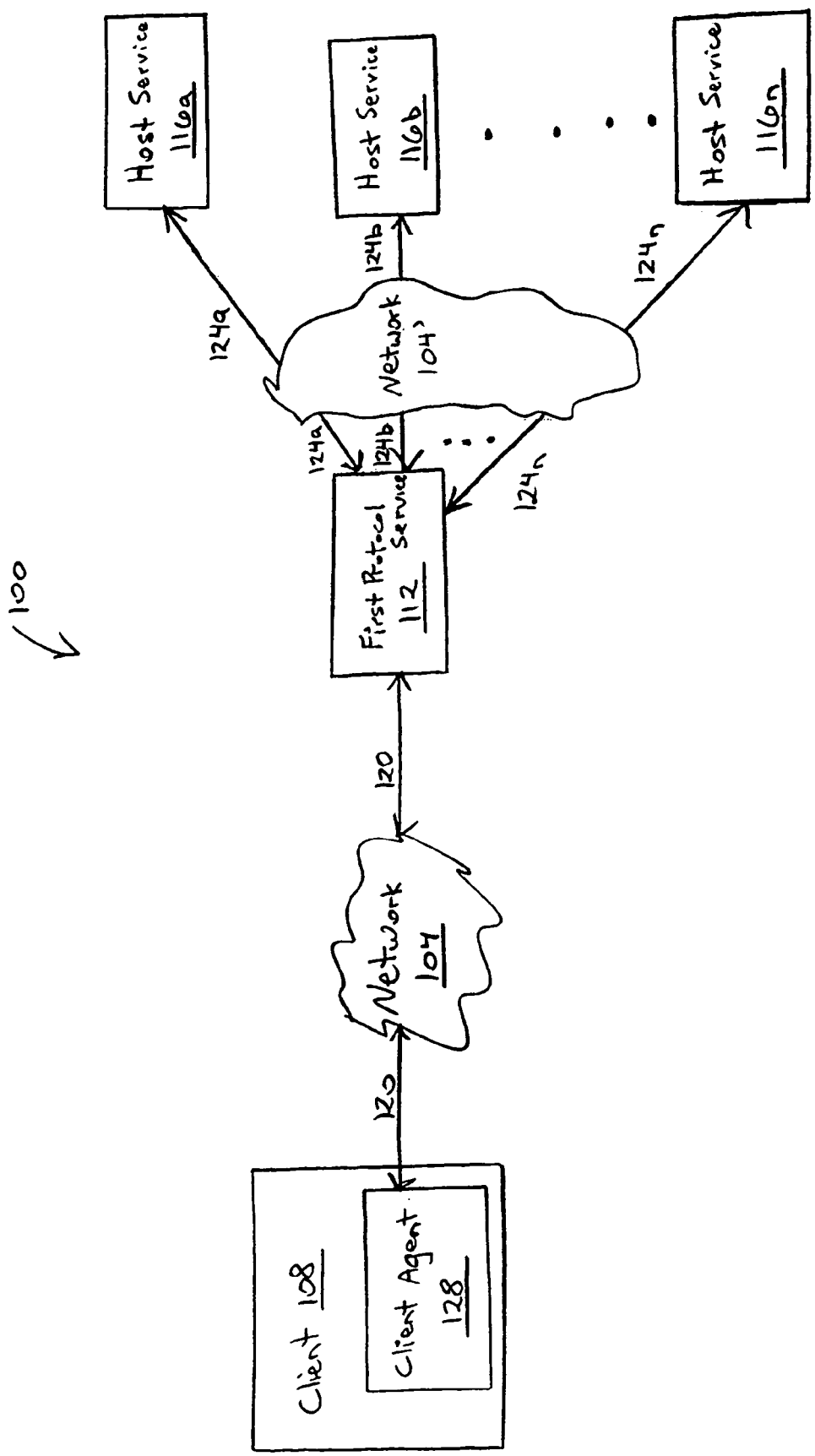
FIG. 1A is a block diagram of a system for providing a client with a reliable connection to a host service according to an illustrative embodiment of the invention.

Referring to FIG. 1A, in general, the invention pertains to network communications and can be particularly useful for providing a client with a reliable connection to a host service. In broad overview, a system 100 for network communications includes a remote client 108 (e.g., a first computing device) in communication with a first protocol service 112 (e.g., a second computing device) over a network 104. Also included in the system 100 are a plurality of host services 116a-116n (e.g., third computing devices) that are in communication, over a network 104', with the first protocol service 112 and, through the first protocol service 112 and over the network 104, with the client 108. Alternatively, in another illustrative embodiment of the invention, and with reference now to FIG. 1B, the first protocol service 112 and the host services 116a-116n are not implemented as separate computing devices, as in FIG. 1A, but, rather, they are incorporated into the same computing device, such as, for example, host node 118a. The system 100 can include one, two, or any number of host nodes 118a-118n.

In one embodiment, the networks 104 and 104' are separate networks, as in FIG. 1A. The networks 104 and 104' can be the same network 104, as in FIG. 1B. In one embodiment, the network 104 and/or the network 104' is, for example, a local-area network (LAN), such as a company Intranet, or a wide area network (WAN), such as the Internet or the World Wide Web. The remote client 108, the first protocol service 112, the host services 116, and/or the host nodes 118 can be connected to the networks 104 and/or 104' through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above.

Moreover, the client 108 can be any workstation, desktop computer, laptop, handheld computer, mobile telephone, or other form of computing or telecommunications device that is capable of communication and that has sufficient processor power and memory capacity to perform the operations described herein. The client 108 can include, for example, a visual display device (e.g., a computer monitor), a data entry device (e.g., a keyboard), persistent and/or volatile storage (e.g., computer memory), a processor, and a mouse.

Similarly, with reference to FIG. 1A, each of the first protocol service 112 and the host services 116 can be provided on any computing device that is capable of communication and that has sufficient processor power and memory capacity to perform the operations described herein. Alternatively, where the functionality of the first protocol service 112 and the host services 116 are incorporated into the same computing device, such as, for example, a host node 118, as in FIG. 1B, the first protocol service 112 and/or the host services 116 can be implemented as a software program running on a general purpose computer and/or as a special purpose hardware device, such as, for example, an ASIC or an FPGA, and the host node 118 can be any computing device that is capable of communication and that has sufficient processor power and memory capacity to perform the operations described herein.

In one embodiment, each of the host services 116 hosts one or more application programs that are remotely available to the client 108. The same application program can be hosted by one or any number of the host services 116. Examples of such applications include word processing programs, such as MICROSOFT WORD, and spreadsheet programs, such as MICROSOFT EXCEL, both of which are available from Microsoft Corporation of Redmond, Wash. Other examples of application programs that may be hosted by any/all of the host services 116 include financial reporting programs, customer registration programs, programs providing technical support information, customer database applications, and application set managers. Moreover, in one embodiment, the host services 116 are audio/video streaming servers that provide streaming audio and/or streaming video to the client 108. In another embodiment, the host services 116 include file servers that provide any/all file types to the client 108.

Figure 1B:
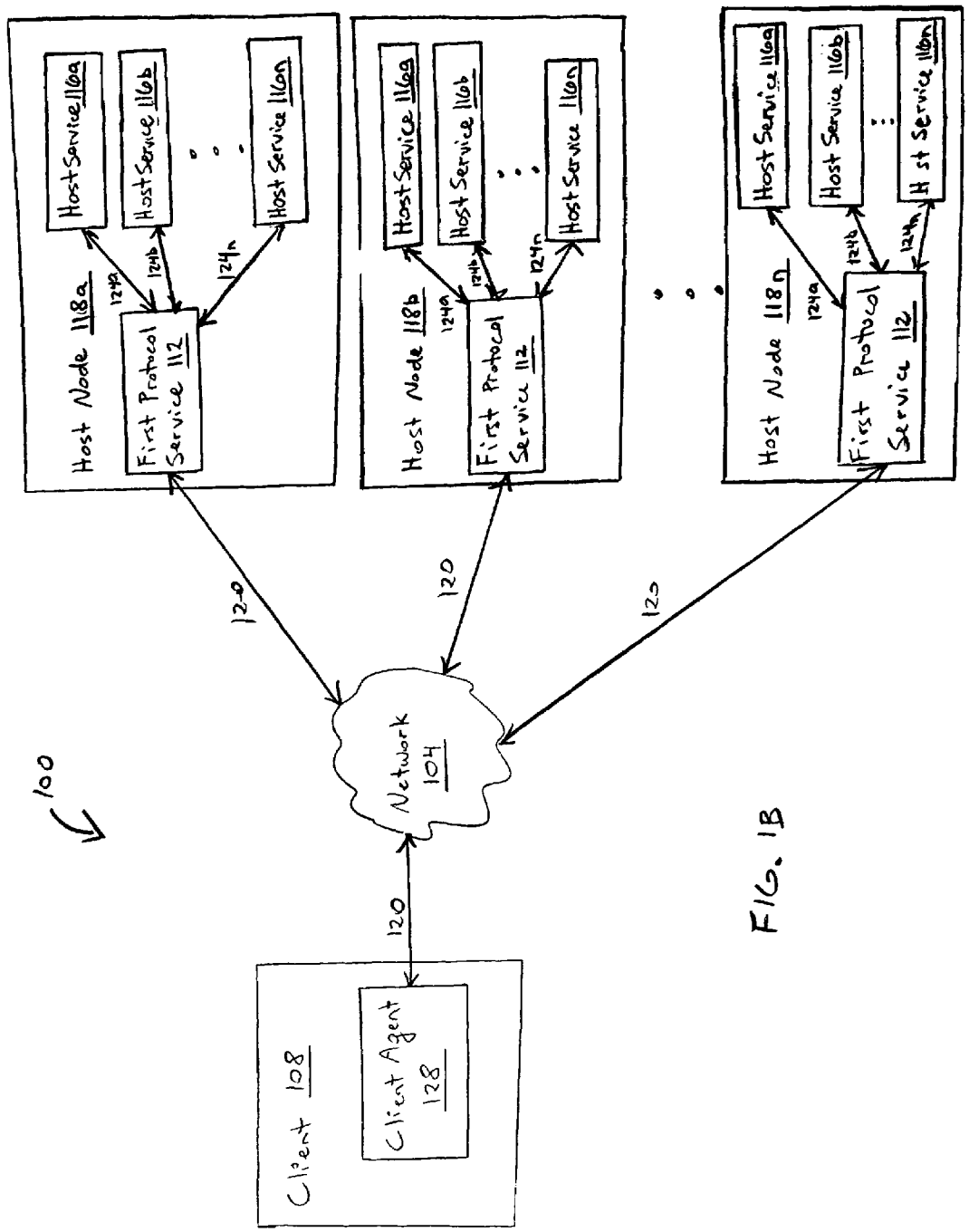
FIG. 1B is a block diagram of a system for providing a client with a reliable connection to a host service according to another illustrative embodiment of the invention.

Referring still to the illustrative embodiments of FIGS. 1A and 1B, the client 108 is configured to establish a connection 120 between the client 108 and a first protocol service 112 over the network 104 using a first protocol. For its part, the first protocol service 112 is configured to accept the connection 120. The client 108 and the first protocol service 112 can, therefore, communicate with one another using the first protocol.

In some embodiments, as shown in FIGS. 1A and 1B, a client agent 128 is included within the client 108. The client agent 128 can be, for example, implemented as a software program and/or as a hardware device, such as, for example, an ASIC or an FPGA. The client agent 128 can use any type of protocol and it can be, for example, an HTTP client agent, an FTP client agent, an Oscar client agent, a Telnet client agent, an Independent Computing Architecture (ICA) client agent from Citrix Systems, Inc. of Fort Lauderdale, Fla., or a Remote Desktop Procedure (RDP) client agent from Microsoft Corporation of Redmond, Wash. In some embodiments, the client agent 128 is itself configured to communicate using the first protocol. In some embodiments (not shown), the client 108 includes a plurality of client agents 128a-128n, each of which communicates with a host service 116a-116n, respectively.

In another embodiment, a standalone client agent is configured to enable the client 108 to communicate using the first protocol. The standalone client agent can be incorporated within the client 108 or, alternatively, the standalone client agent can be separate from the client 108. The standalone client agent is, for example, a local host proxy. In general, the standalone client agent can implement any of the functions described herein with respect to the client agent 128.

As also described further below, the first protocol service 112 is, in one embodiment, itself configured to communicate using the first protocol.

The first protocol service 112 is configured to establish a connection 124a-124n between the first protocol service 112 and the host service 116a-116n, respectively. For example, the first protocol service 112 can establish a connection 124a between the first protocol service 112 and one host service 116a and a connection 124b between the first protocol service 112 and another host service 116b. In one embodiment, the first protocol service 108 separately establishes such connections 124a-124n (i. e., the first protocol service 112 establishes one connection at a time). In another embodiment, the first protocol service 112 simultaneously establishes two or more of such connections 124a-124n.

In yet another embodiment, the first protocol service 112 is configured to provide two or more connections 124 without interrupting the connection 120 with the client 108. For example, the first protocol service 112 can be configured to establish the connection 124a between the first protocol service 112 and the host service 116a when a user of the client 108 requests execution of a first application program residing on the host service 116a. When the user ends execution of the first application program and initiates execution of a second application program residing, for example, on the host service 116b, the first protocol service 112 is, in one embodiment, configured to interrupt the connection 124a and establish the connection 124b between the first protocol service 112 and the host service 116b, without disrupting the connection 120 between the first protocol service 112 and the client 108.

The first protocol service 112 and the host services 116a-116n can communicate over the connections 124a-124n, respectively, using any one of a variety of secondary protocols, including, but not limited to, HTTP, FTP, Oscar, Telnet, the ICA presentation protocol from Citrix Systems, Inc. of Fort Lauderdale, Fla., and/or the RDP presentation protocol from Microsoft Corporation of Redmond, Wash. For example, the first protocol service 112 and the host service 116a can communicate over the connection 124a using the ICA presentation protocol, while the first protocol service 112 and the host service 116b can communicate over the connection 124b using the RDP presentation protocol.

In one embodiment, the secondary protocol used for communicating between the first protocol service 112 and a host service 116, such as, for example, the ICA presentation protocol, includes a plurality of virtual channels. A virtual channel is a session-oriented transmission connection that is used by application-layer code to issue commands for exchanging data. For example, each of the plurality of virtual channels can include a plurality of protocol packets that enable functionality at the remote client 108. In one embodiment, one of the plurality of virtual channels includes protocol packets for transmitting graphical screen commands from a host service 116, through the first protocol service 112, to the client 108, for causing the client 108 to display a graphical user interface. In another embodiment, one of the plurality of virtual channels includes protocol packets for transmitting printer commands from a host service 116, through the first protocol service 112, to the client 108, for causing a document to be printed at the client 108.

In one embodiment, the first protocol is a tunneling protocol. The first protocol service 112 encapsulates a plurality of secondary protocols, each used for communication between one of the host services 116 and the first protocol service 112, within the first protocol. As such, the host services 116 and the first protocol service 112 communicate with the client 108 via the plurality of secondary protocols. In one embodiment, the first protocol is, for example, an application-level transport protocol, capable of tunneling the multiple secondary protocols over a TCP/IP connection.

Figure 2:
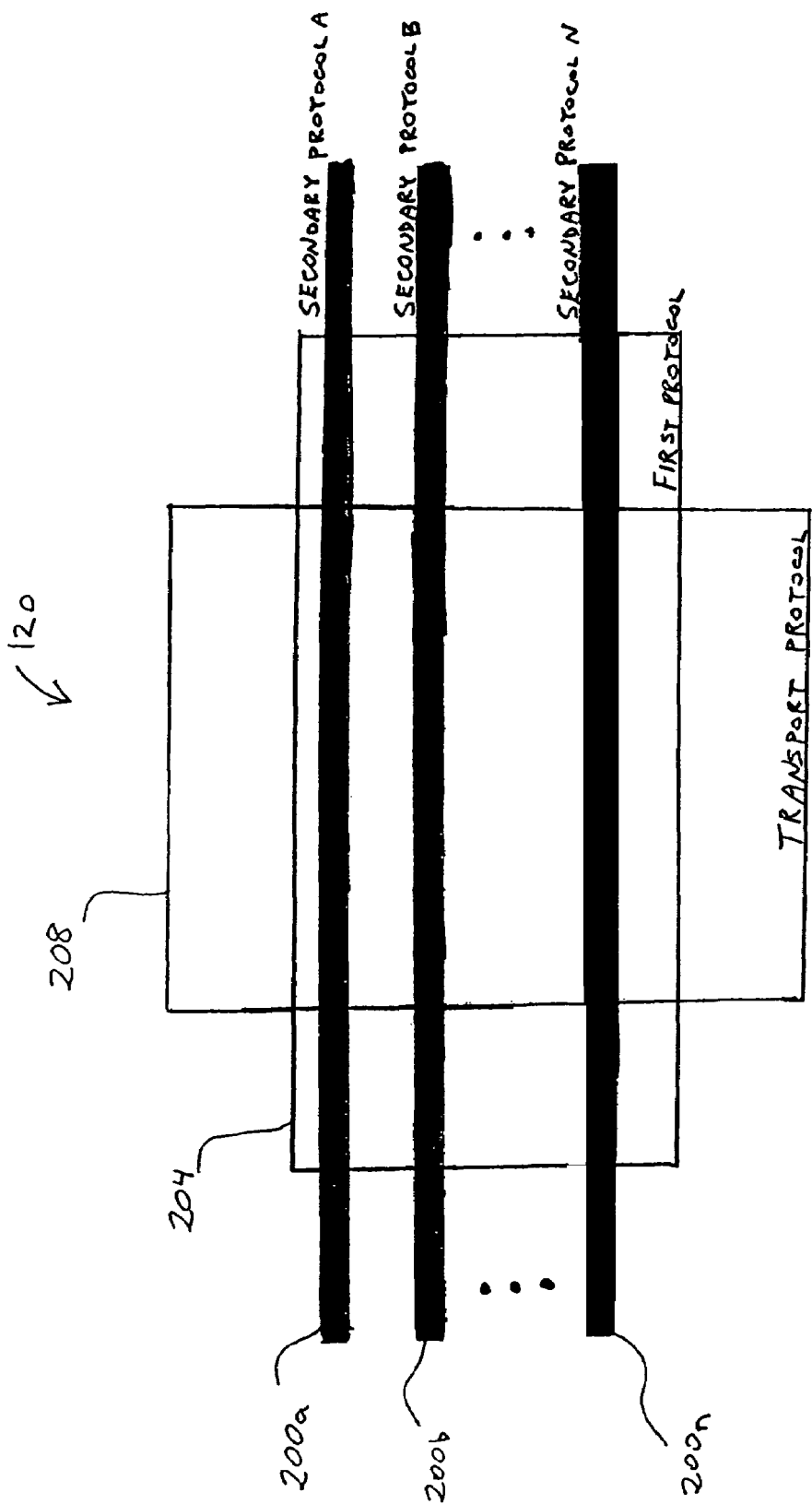
FIG. 2 depicts communications occurring over a network according to an illustrative embodiment of the invention.

Referring to FIG. 2, conceptually, communications between the client 108 and the first protocol service 112 via the connection 120 take the form of a plurality of secondary protocols 200a-200n (e.g., HTTP, FTP, Oscar, Telnet, ICA, and/or RDP) encapsulated within a first protocol 204. This is indicated by the location of secondary protocols 200a-200n inside the first protocol 204. Where secure communication is not called for, the first protocol 204 can be, as illustrated in FIG. 2, communicated over a TCP connection 208.

Figure 3:
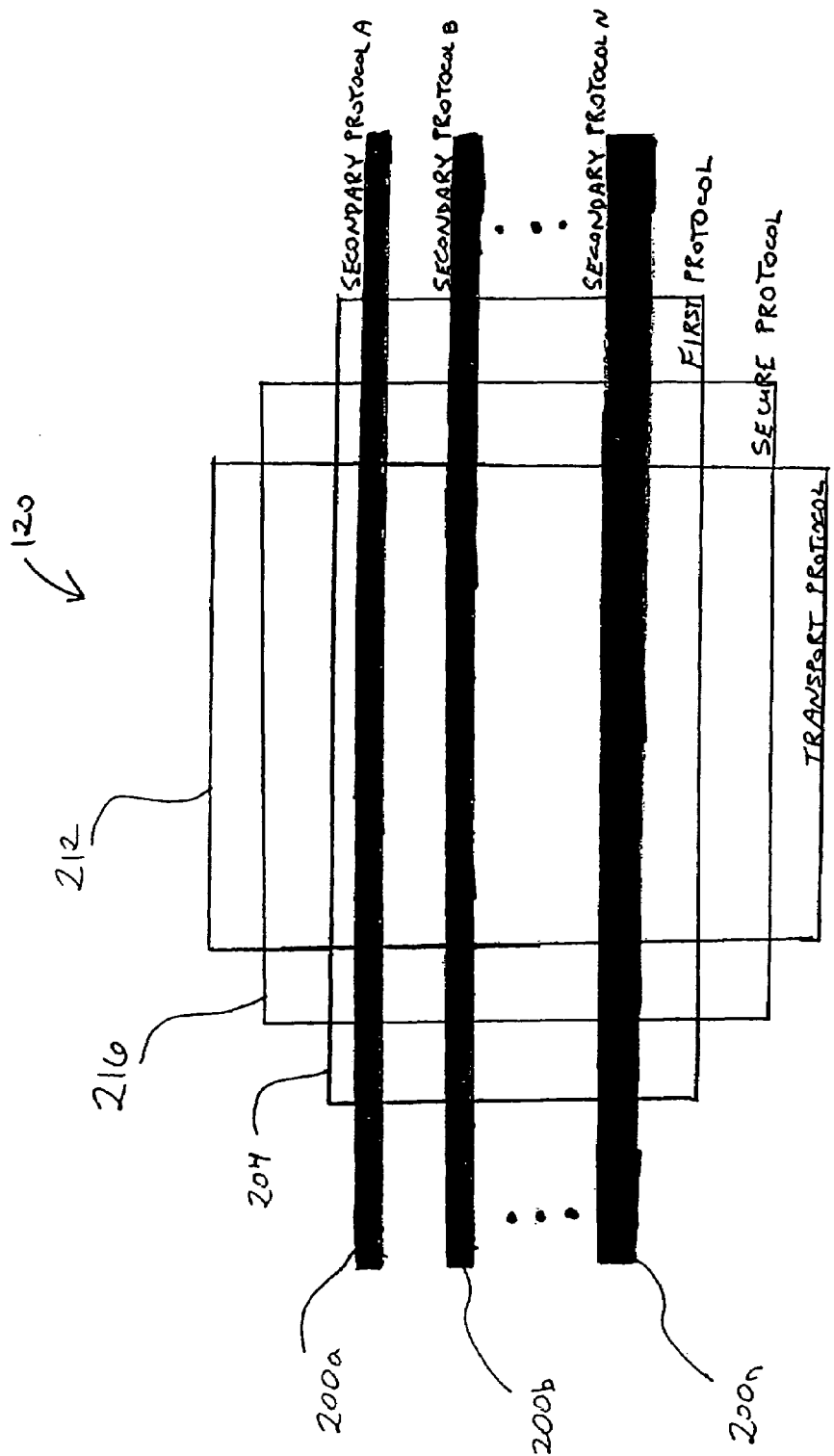
FIG. 3 depicts communications occurring over a network according to another illustrative embodiment of the invention.

Referring now to FIG. 3, if secure communication is used, the first protocol 204 is communicated over an encrypted connection, such as, for example, a TCP connection 212 secured by using the Secure Socket Layer (SSL) 216 protocol. SSL is a secure protocol first developed by Netscape Communication Corporation of Mountain View, Calif., and is now a standard promulgated by the Internet Engineering Task Force (IETF) as the Transport Layer Security (TLS) protocol and described in IETF RFC-2246.

Thus, the plurality of secondary protocols 200a-200n are communicated within the first protocol 204 with (FIG. 3) or without (FIG. 2) security over the connection 120.

In one embodiment, the first protocol 204 allows the secondary protocol connections 200 tunneled therein, such as, for example, an HTTP connection 200, to be opened and/or closed, repetitively, without also requiring the transport connection over which the first protocol 204 is communicated (e.g., TCP connection 208 and/or 212), the SSL protocol connection 216, or the first protocol connection 204 itself to similarly be repetitively opened and/or closed.

Figure 4:
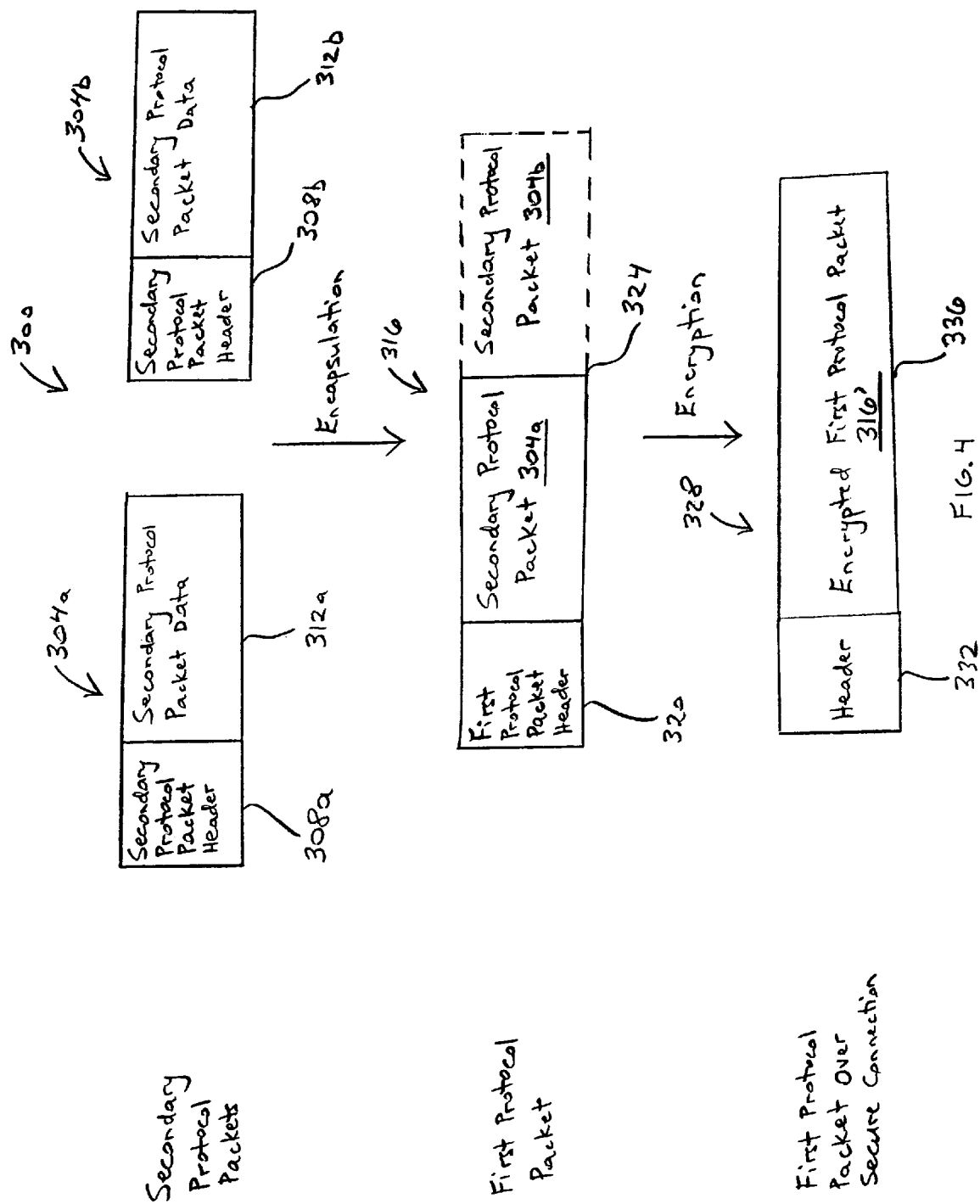
FIG. 4 depicts a process for encapsulating a plurality of secondary protocols within a first protocol for communication over a network according to an illustrative embodiment of the invention.

Referring to FIG. 4, an example process 300 used by the first protocol service 112 and the client agent 128 of the client 108 encapsulates the plurality of secondary protocols 200 (e.g., HTTP, FTP, Oscar, Telnet, ICA, and/or RDP) within the first protocol 204 for communication via the connection 120. Optionally, as described below, the example process 300 used by the first protocol service 112 and the client agent 128 of the client 108 also compresses and/or encrypts the communications at the level of the first protocol prior to communications via the connection 120. From the point of view of the first protocol service 112, secondary protocol packets 304 are received via the connections 124 at the first protocol service 112. For example, two secondary protocol packets 304a and 304b are received by the first protocol service 112. One, two, or any number of secondary protocol packets 304 can be received. In one embodiment, the secondary protocol packets 304 are transmitted by the host services 116 to the first protocol service 112 over the connection 124. The secondary protocol packets 304 include a header 308 and a data payload 312.

Following receipt of the secondary protocol packets 304, the first protocol service 112 encapsulates one or more of the secondary protocol packets 304 within a first protocol packet 316. In one embodiment, the first protocol service 112 generates a first protocol packet header 320 and encapsulates within the data payload 324 of the first protocol packet 316 one or more secondary protocol packets 304, such as, for example, two secondary protocol packets 304a and 304b. In another embodiment, only one secondary protocol packet 304a is encapsulated in each first protocol packet 316.

In one embodiment, the first protocol packets 316 are then transmitted over the connection 120, for example over the connection 208 described with reference to FIG. 2, to the client agent 128 of the client 108. Alternatively, in another embodiment, the first protocol service 112 is further configured to encrypt, prior to the transmission of any first protocol packets 316, communications at the level of the first protocol 204. In one such embodiment, the first protocol packets 316 are encrypted by using, for example, the SSL protocol described with reference to FIG. 3. As a result, a secure packet 328, including a header 332 and an encrypted first protocol packet 316' as a data payload 336, is generated. The secure packet 328 can then be transmitted over the connection 120, for example over the secure TCP connection 212 illustrated in FIG. 3, to the client agent 128 of the client 108.

In another embodiment, the first protocol service 112 is further configured to compress, prior to the transmission of any first protocol packets 316, communications at the level of the first protocol 204. In one embodiment, prior to encrypting the first protocol packet 316, the first protocol service 112 compresses, using a standard compression technique, the first protocol packet 316. As such, the efficiency of the system 100 is improved.

Referring again to FIGS. 1A-1B, the system 100 of the present invention, in one embodiment, provides the remote client 108 with a reliable connection to a host service 116, such as, for example, the host service 116a. For example, if the client 108 establishes a connection 120 between the client 108 and the first protocol service 112 and the first protocol service 112 establishes a connection 124a between the first protocol service 112 and the host service 116a, then either the client agent 128, the first protocol service 112, or both are configured to maintain a queue of the first protocol data packets most recently transmitted via the connection 120. For example, the queued data packets can be maintained by the client agent 128 and/or the first protocol service 112 both before and upon a failure of the connection 120. Moreover, upon a failure of the connection 120, the first protocol service 112 and, likewise, the host service 116a are configured to maintain the connection 124a.

Following a failure of the connection 120, the client 108 establishes a new connection 120 with the first protocol service 112, without losing any data. More specifically, because the connection 124a is maintained upon a failure of the connection 120, a newly established connection 120 can be linked to the maintained connection 124a. Further, because the most recently transmitted first protocol data packets are queued, they can be again transmitted by the client 108 to the first protocol service 112 and/or by the first protocol service 112 to the client 108 over the newly established connection 120. As such, the communication session between the host service 116a and the client 108, through the first protocol service 112, is persistent and proceeds without any loss of data.

In one embodiment, the client agent 128 of the client 108 and/or the first protocol service 112 number the data packets that they transmit over the connection 120. For example, each of the client agent 128 and the first protocol service 112 separately numbers its own transmitted data packets, without regard to how the other is numbering its data packets. Moreover, the numbering of the data packets can be absolute, without any re-numbering of the data packets, i.e., the first data packet transmitted by the client agent 128 and/or the first protocol service 112 can be numbered as No. 1, with each data packet transmitted over the connection 120 by the client agent 128 and/or the first protocol service 112, respectively, consecutively numbered thereafter.

In one such embodiment, following a disrupted and re-established connection 120, the client agent 128 and/or the first protocol service 112 informs the other of the next data packet that it requires. For example, where the client agent 128 had received data packets Nos. 1-10 prior to the disruption of connection 120, the client agent 128, upon re-establishment of the connection 120, informs the first protocol service 112 that it now requires data packet No. 11. Similarly, the first protocol service 112 can also operate as such. Alternatively, in another such embodiment, the client agent 128 and/or the first protocol service 112 informs the other of the last data packet received. For example, where the client agent 128 had received data packets Nos. 1-10 prior to the disruption of connection 120, the client agent 128, upon re-establishment of the connection 120, informs the first protocol service 112 that it last received data packet No. 10. Again, the first protocol service 112 can also operate as such. In yet another embodiment, the client agent 128 and/or the first protocol service 112 informs the other, upon re-establishment of the connection 120, of both the last data packet received and the next data packet it requires.

In such embodiments, upon re-establishment of the connection 120, the client agent 128 and/or the first protocol service 112 can re-transmit the buffered data packets not received by the other, allowing the communication session between a host service 116 and the client 108, through the first protocol service 112, to proceed without any loss of data. Moreover, upon re-establishment of the connection 120, the client agent 128 and/or the first protocol service 112 can flush from each of their respective buffers the buffered data packets now known to be received by the other.

Figure 5:
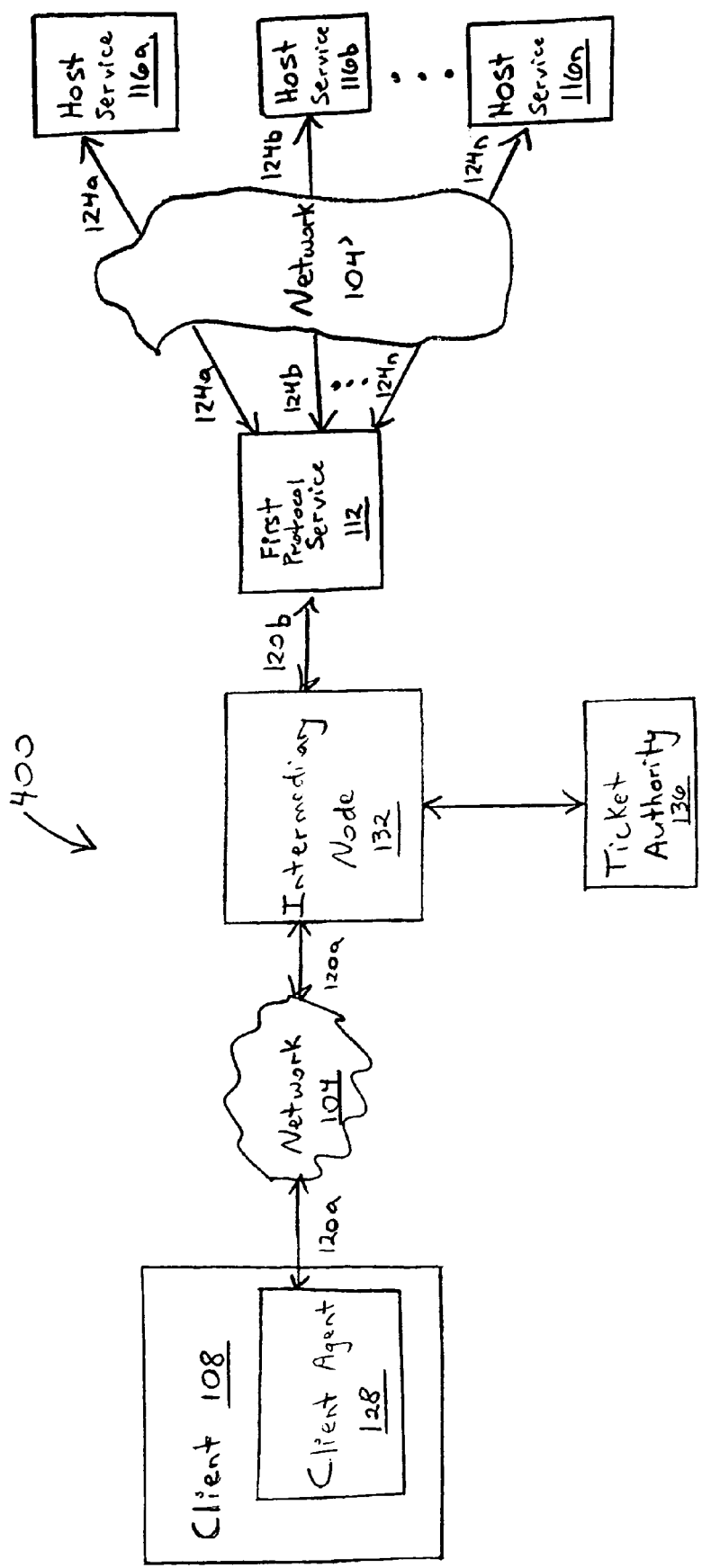
FIG. 5 is a block diagram of the illustrative system of FIG. 1A further including components for re-connecting the client to a host service according to an illustrative embodiment of the invention.

FIG. 5 depicts another illustrative embodiment of a system 400 that is capable of re-connecting the client 108 to a host service 116, as described above. In addition to the networks 104 and 104', the client 108, the first protocol service 112, and the host services 116, all of which are described above, the system 400 further includes an intermediary node 132, and a ticket authority 136. In one embodiment, the intermediary node 132 is a security gateway, such as, for example, a firewall and/or a router, through which messages between the client 108 and the first protocol service 112 must pass due to the configuration of the network 104. The ticket authority 136 can be, as illustrated, a stand-alone network component that is capable of communication and that has sufficient processor power and memory capacity to perform the operations described herein.

As shown in the illustrative embodiment of FIG. 5, the intermediary node 132 is configured to accept a connection 120a initiated by the client 108 and to establish a second connection 120b with the first protocol service 112. Together, the connection 120a and the second connection 120b constitute the connection 120, described above, over which the client 108 and the first protocol service 112 communicate using the first protocol.

The intermediary node 132, as shown, is also configured to communicate with the ticket authority 136. In one embodiment, the ticket authority 136 is configured to receive a request for a first re-connection ticket from the intermediate node 132 and to thereafter generate the first re-connection ticket. The first re-connection ticket can include, for example, a large random number.

In another embodiment, the ticket authority 136 is configured to generate a handle. The handle can be, for example, a random number that is associated with (e.g., mapped to) the first re-connection ticket. In one embodiment, the handle is a smaller random number than the random number forming the first re-connection ticket. For example, the handle may be a 32-bit random number. The ticket authority 136 transmits the first re-connection ticket and the handle to the intermediary node 132, while keeping a copy of the first re-connection ticket and a copy of the handle. The copy of the first re-connection ticket can later be used by the ticket authority 136 to validate the first re-connection ticket originally transmitted to the client 108 when it is later presented to the ticket authority 136 during the process of re-connecting the client 108. In one embodiment, the ticket authority 136 also keeps an address for the first protocol service 112, which, as explained below, is associated with the first re-connection ticket and, upon validation of the first re-connection ticket, is transmitted to the intermediary node 132.

In one embodiment, the intermediary node 132 is further configured to use the handle transmitted to it by the ticket authority 136 to delete the copy of the first re-connection ticket kept at the ticket authority 136. In another embodiment, as described below, the ticket authority 136 is further configured to delete, during the process of re-connecting the client 108 to a host service 116, the first re-connection ticket and thereafter generate a replacement first re-connection ticket. Additionally, in another embodiment, the first re-connection ticket is configured for automatic deletion after a pre-determined period of time.

In another embodiment, the first protocol service 112 is configured to generate a second re-connection ticket, which, as in the case of the first re-connection ticket, can include, for example, a large random number. The first protocol service 112 can also be configured to transmit the second re-connection ticket to the client 108, while keeping a copy of the second re-connection ticket and a session number. The copy of the second re-connection ticket can later be used by the first protocol service 112 to validate the second re-connection ticket originally transmitted to the client 108 when it is later presented to the first protocol service 112 during the process of re-connecting the client 108. In one embodiment, the first protocol service 112 transmits the second re-connection ticket to the client 108 via the intermediary node 132. In another embodiment, the first protocol service 112 transmits the second re-connection ticket to the client 108 directly. Moreover, as described in greater detail below, the first protocol service 112 can be further configured to delete, during the process of re-connecting the client 108 to a host service 116, the second re-connection ticket, and thereafter generate a replacement second re-connection ticket. Additionally, in another embodiment, the second re-connection ticket is configured for automatic deletion after a pre-determined period of time.

In one embodiment, the intermediary node 132 serves as an intermediary for the first and second re-connection tickets. The intermediary node 132 receives, for example, the first re-connection ticket generated by the ticket authority 136 and the second re-connection ticket generated by the first protocol service 112. The intermediary node 132 can then transmit the first re-connection ticket and the second re-connection ticket to the client 108. Moreover, during the process of re-connecting the client 108 to a host service 116, the intermediary node 132 can accept the first re-connection ticket and the second re-connection ticket from the client 108 and thereafter transmit the first re-connection ticket to the ticket authority 136 and, if appropriate, the second re-connection ticket to the first protocol service 112.

The process of re-connecting the client 108 to a host service 116, and the use of the first and second re-connection tickets, will be further described by reference to the methods described below with reference to FIGS. 7-10.

Figure 6A:
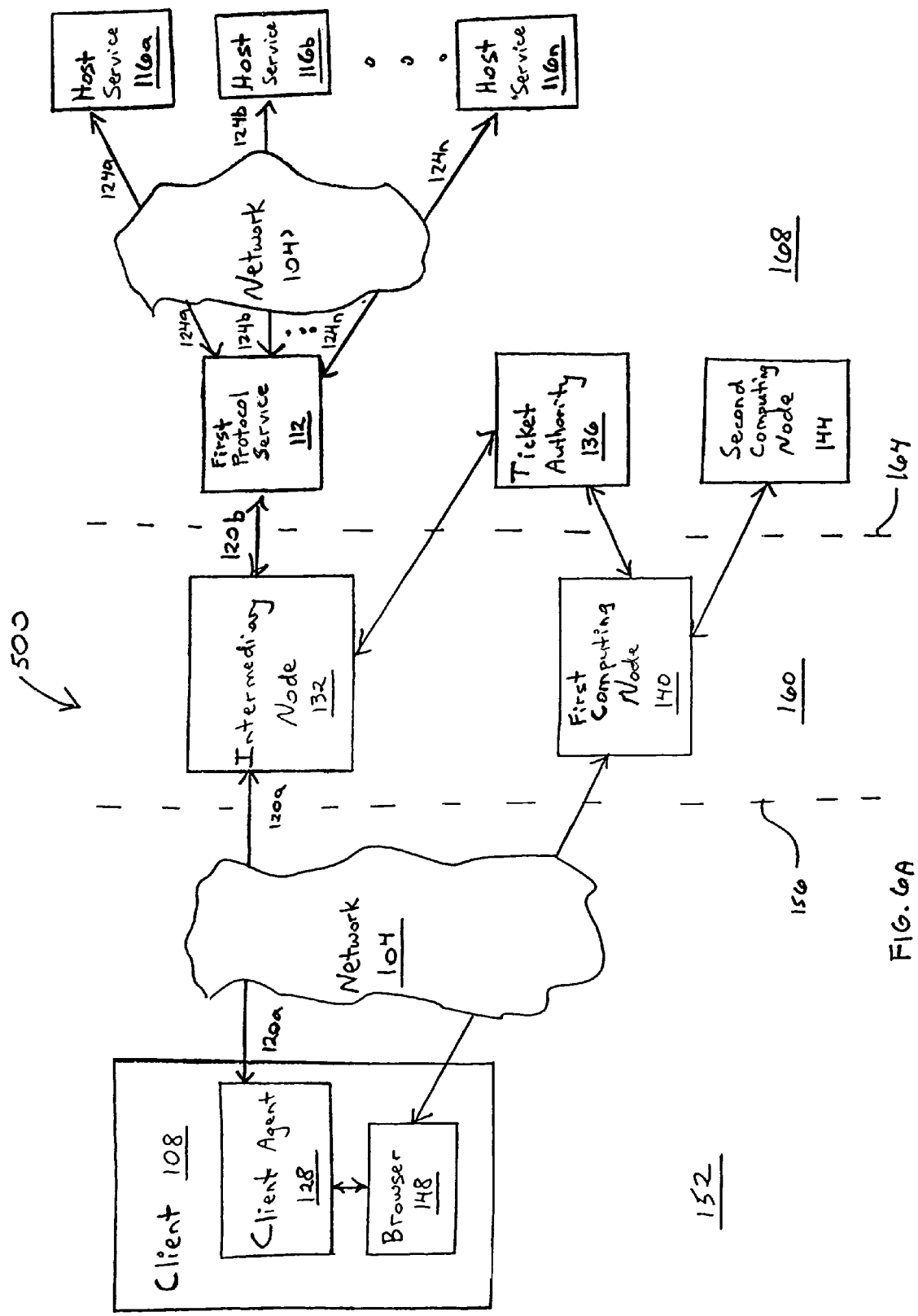
FIG. 6A is a block diagram of the illustrative system of FIG. 5 further including components for initially connecting the client to a host service according to an illustrative embodiment of the invention.

Referring to FIG. 6A, another embodiment of a system 500 for network communications includes the networks 104 and 104', the client 108, the first protocol service 112, the host services 116, the intermediary node 132, and the ticket authority 136, as described above, and further depicts a first computing node 140 and a second computing node 144, both of which are used, in one embodiment, for initially connecting the client 108 to a host service 116. Moreover, in the illustrative embodiment of FIG. 6A, the client 108 further includes a web browser 148, such as, for example, the INTERNET EXPLORER program from Microsoft Corporation of Redmond, Wash., to connect to the World Wide Web.

In one embodiment (not shown), the system 500 includes two or more intermediary nodes 132 and/or two or more first protocol services 112. The intermediary node 132, through which messages between the client 108 and the first protocol service 112 must pass, and/or the first protocol service 112 can, as explained below, each be chosen based on, for example, a load balancing equation.

Each of the first computing node 140 and the second computing node 144 can be any computing device that is capable of communication and that has sufficient processor power and memory capacity to perform the operations described herein. For example, in one embodiment, the first computing node 140 is a web server, providing one or more websites. In another embodiment, the second computing node 144 provides an XML service.

In one embodiment, the client 108 and the network 104 form an external network 152, separated from the rest of the system 500 by a first firewall 156, depicted as a dashed line. The intermediary node 132 and the first computing node 140 can be located in a "demilitarized zone" 160 (i.e., a network region placed between a company's private network and the public network), separated from the rest of the system 500 by the first firewall 156 and a second firewall 164, also depicted by a dashed line. Then, as shown, the network 104', the first protocol service 112, the host services 116a-116n, the ticket authority 136, and the second computing node 144, form an internal network 168, separated from the rest of the system 100 by the second firewall 164.

Figure 6B:
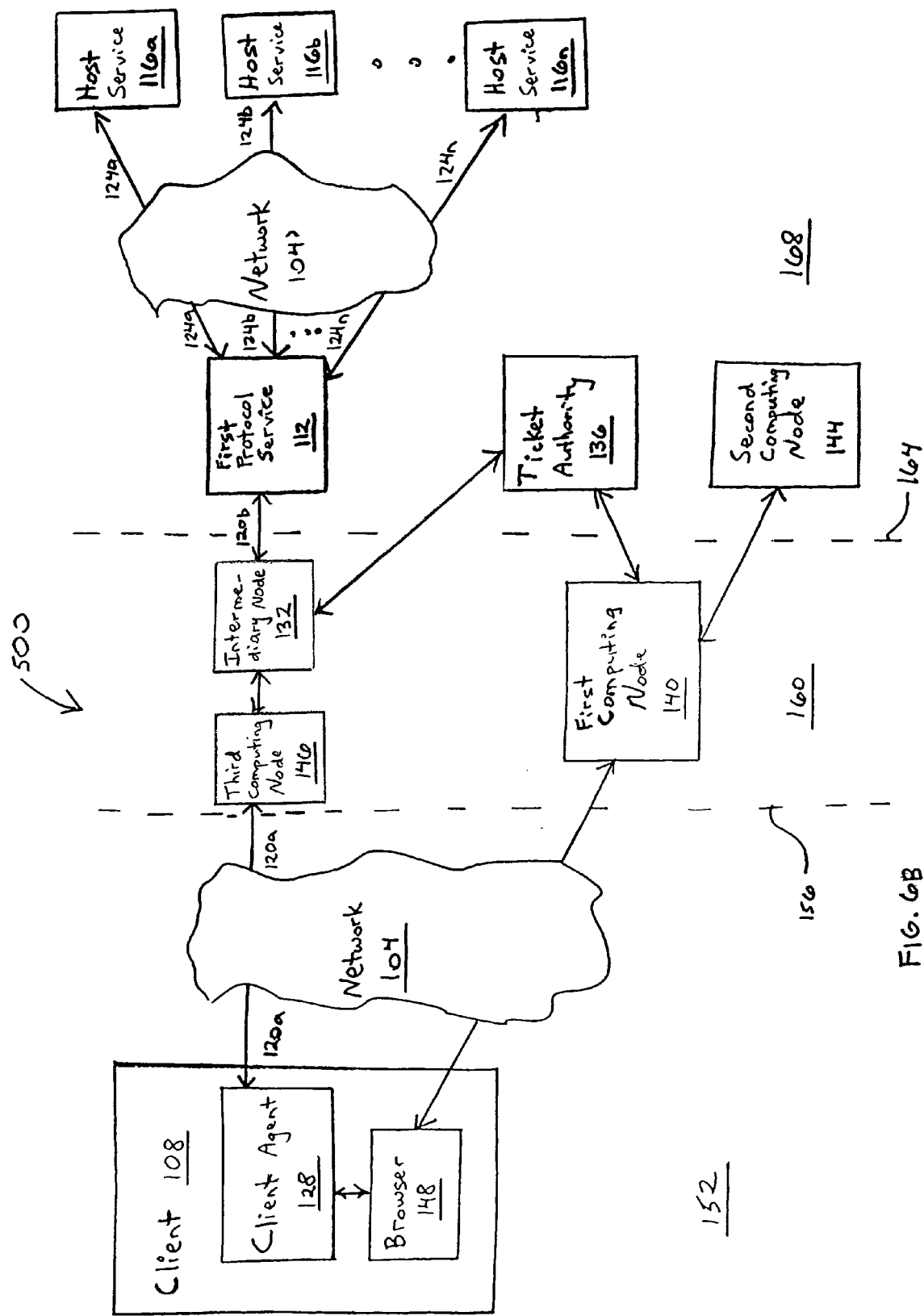
FIG. 6B is a block diagram of the illustrative system of FIG. 6A further including a component for initially connecting the client to the host service and for re-connecting the client to the host service according to an illustrative embodiment of the invention.

Alternatively, in another embodiment, and with reference to FIG. 6B, the system 500 further includes a third computing node 146 positioned, in the demilitarized zone 160, between the network 104 and the intermediary node 132. The third computing node 146 can be any computing device that is capable of networked communication and that has sufficient processor power and memory capacity to perform the operations described herein. As described below, the third computing node 146 is used, in some embodiments, during the process of initially connecting the client 108 to a host service 116 and/or during the process of re-connecting the client 108 to a host service 116. More specifically, as described below, where the system 500 includes two or more intermediary nodes 132, the third computing node 146 can, based on a load balancing equation for example, choose the intermediary node 132 through with communications between the client agent 128 of the client 108 and the first protocol service 112 must pass.

Figure 6C:
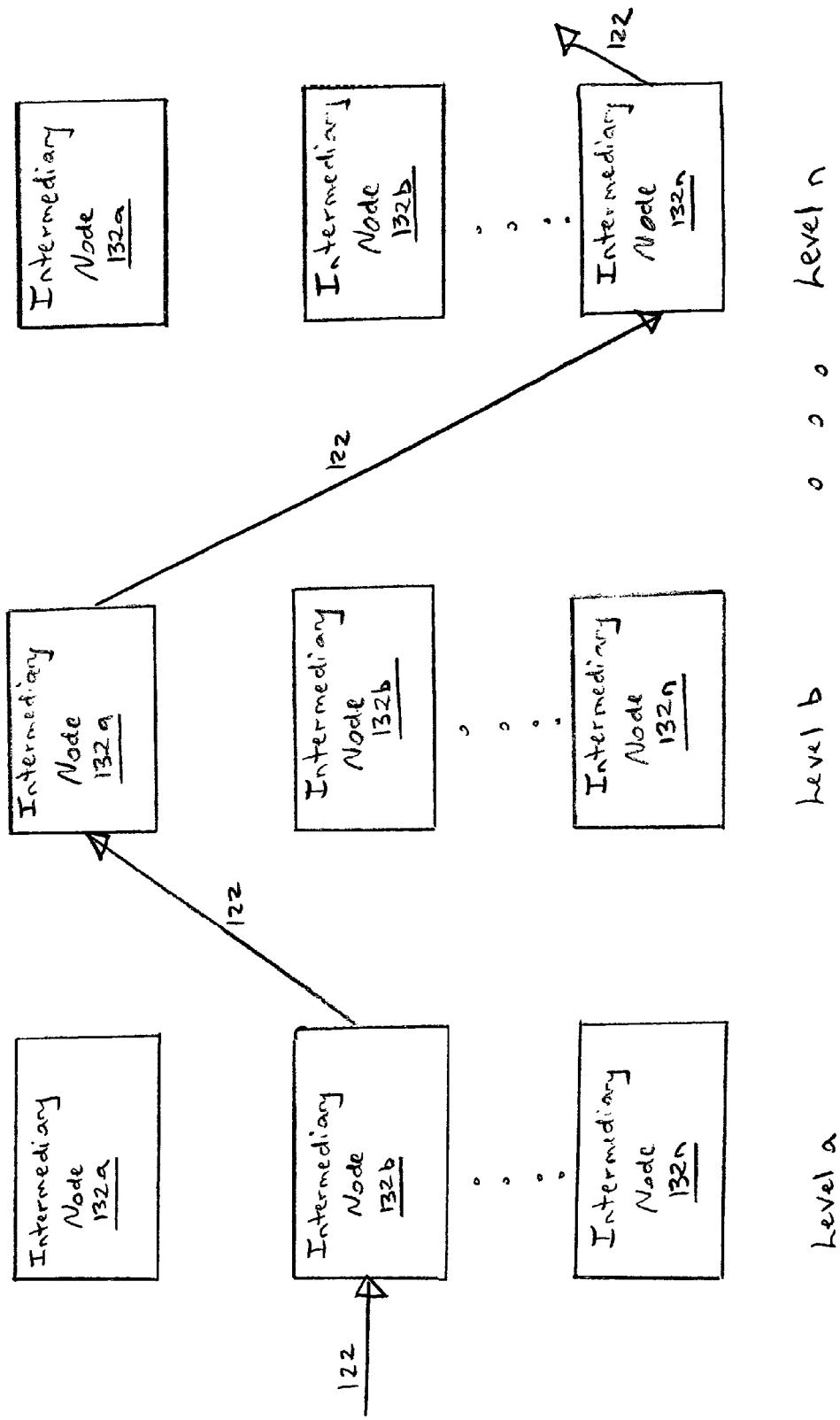
FIG. 6C is a block diagram of an alternative embodiment of the system of FIG. 6B.

Moreover, referring to FIG. 6C, the intermediary node 132 of FIG. 6B can, in an alternative embodiment, be replaced by two or more levels "a"-"n" of intermediary nodes 132. As illustrated, each level "a"-"n" can include two or more intermediary nodes 132a-132n. As described below, the client agent 128 of the client 108 can be routed through any combination of the intermediary nodes 132 based on, for example, load balancing equations. For example, as illustrated, the client agent 128 can be routed through the intermediary nodes 132 via connection 122. Other configurations of the system 500, as would be readily apparent to one skilled in the art, are also possible.

Referring again to FIG. 6A, in one embodiment, the web browser 148 communicates over the network 104 with the first computing node 140, which itself interfaces with the second computing node 144 and the ticket authority 136. More specifically, the first computing node 140 is configured with the address of the second computing node 144 and the ticket authority 136. In one embodiment, as explained further below, the first computing node 140 is configured to relay information between, and thereby prevent direct communication between, the web browser 148 of the client 108, the second computing node 144, and the ticket authority 136. By preventing such direct communication, the first computing node 140 adds an additional level of security to the system 500. The first computing node 140 can also be configured with the address of the intermediary node 132, or, alternatively, with the address of two or more intermediary nodes 132.

For its part, the second computing node 144 is configured to determine which of the application programs running on the host services 116 are available to a user of the client 108. In other words, the second computing node 144 is configured to determine which of the application programs the user is authorized to access. In one embodiment, after the user selects his desired application program, as described further below, the second computing node 144 is further configured to determine which of the host services 116 will be used to run the user's desired application for purposes of load balancing. The second computing node 144 returns the address of that host service 116 to the first computing node 140. The second computing node 144 also returns the address of the first protocol service 112, which can also be selected from amongst a plurality of first protocol services 112 through the use of a load balancing equation, to the first computing node 140. In turn, the first computing node 140, transmits the address of the chosen first protocol service 112 and the chosen host service 116 to the ticket authority 136.

For its part, the ticket authority 136 generates connection tickets. In one embodiment, the ticket authority 136 transmits an initial connection ticket to the first computing node 140 for transmission to the client 108. In another embodiment, the ticket authority transmits a first re-connection ticket to the intermediary node 132.

The process of initially connecting the client 108 to the host service 116, and the roles of the ticket authority 136, the first computing node 140, the second computing node 144, and the third computing node 146 therefor, is explained below.

Figure 7:
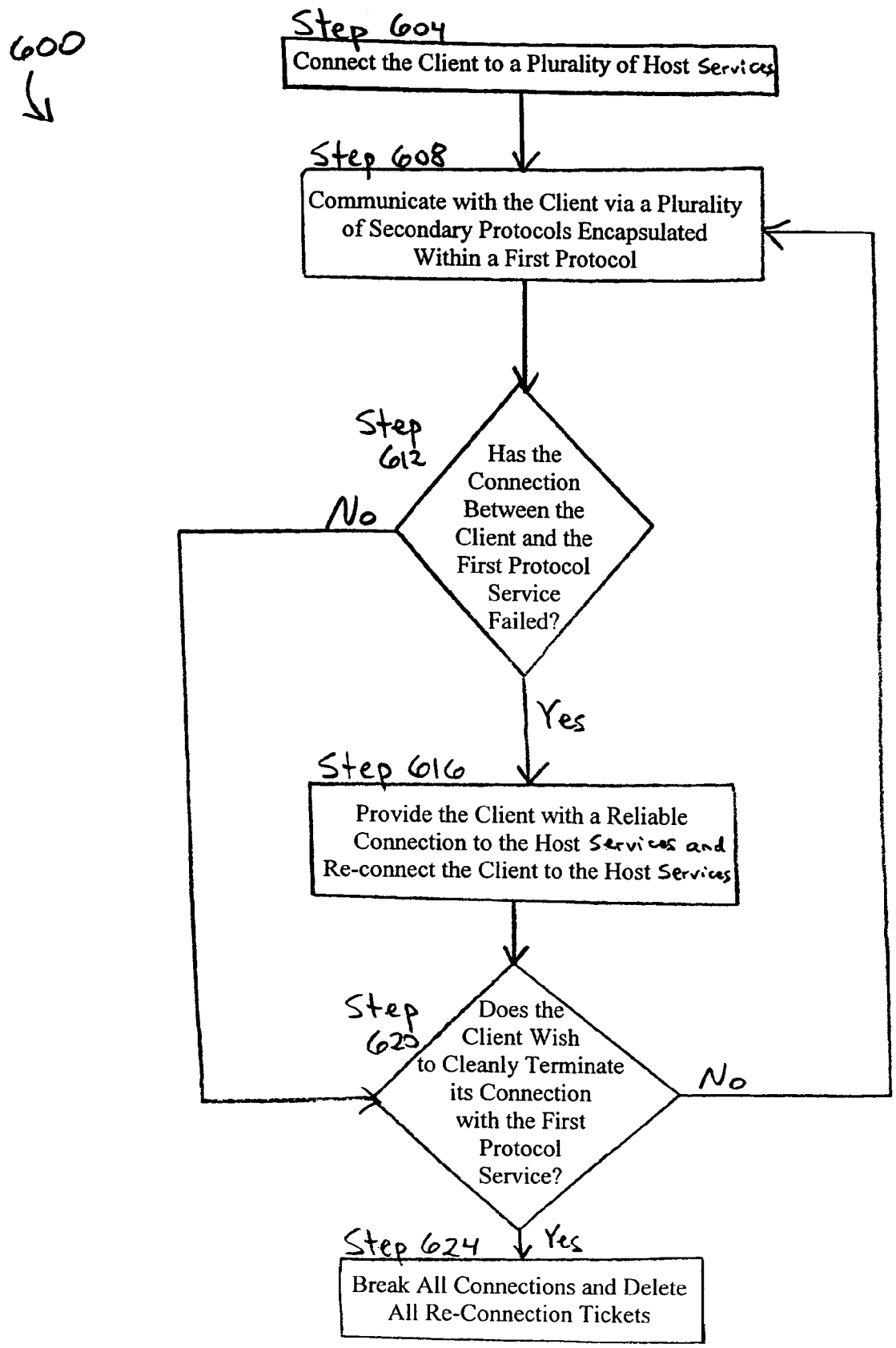
FIG. 7 is a flow diagram of a method for network communications according to an illustrative embodiment of the invention.

Referring now to FIG. 7, one embodiment of a method 600 for network communications, using the exemplary embodiment of FIGS. 6A-6C, is illustrated. At step 604, the client 108 initially connects to a plurality of host services 116 by employing, for example, the method 700 described below. After the client 108 is connected to the plurality of host services 116, the client 108 and the host services 116 communicate, through the first protocol service 112, and at step 608, via a plurality of secondary protocols encapsulated within the first protocol. In one embodiment, the first protocol service 112 encrypts, prior to the transmission of any first protocol packets, communications at the level of the first protocol 204, thereby securing the communications. In another embodiment, the first protocol service 112 compresses, prior to the transmission of any first protocol packets, the communications at the level of the first protocol, thereby improving communication efficiency.

At step 612, the client agent 128 determines whether the connection 120 between the client agent 128 and the first protocol service 112 has failed. For example, the connection 120a between the client agent 128 and the intermediary node 132 may have failed, the connection 120b between the intermediary node 132 and the first protocol service 112 may have failed, or both the connection 120a and the connection 120b may have failed. If the client agent 128 determines that the connection 120 has not failed, the method 600 proceeds to step 620. If, on the other hand, the client agent 128 determines that the connection 120 has failed, the client 108 is, at step 616, provided with a reliable connection to the host services 116 and re-connected to the host services 116.

It is determined, at step 620, whether the client 108 wishes to cleanly terminate its connection 120 with the first protocol service 112 and, consequently, its connections 124a-124n with the host services 116. If not, communication between the client 108 and the first protocol service 112, via the plurality of secondary protocols encapsulated within the first protocol, continues at step 608. If so, then, at step 624, all connections 120a, 120b, and 124a-124n are broken and all re-connection tickets are deleted. In one embodiment, the intermediary node 132 uses a handle it receives from the ticket authority 136 to delete a copy of a first re-connection ticket kept at the ticket authority 136. In another embodiment, the first protocol service 112 deletes a copy of a second re-connection ticket kept at the first protocol service 112.

In a further embodiment, if for some reason a secondary protocol connection 124 fails, a copy of the second re-connection ticket associated therewith and kept at the first protocol service 112 is deleted by the first protocol service 112. In yet another embodiment, a first re-connection ticket and/or a second re-connection ticket is automatically deleted after a pre-determined period of time following a failure in the connection 120, as at step 612, and/or following a clean termination of the connection 120, as at step 620.

Figure 8B:
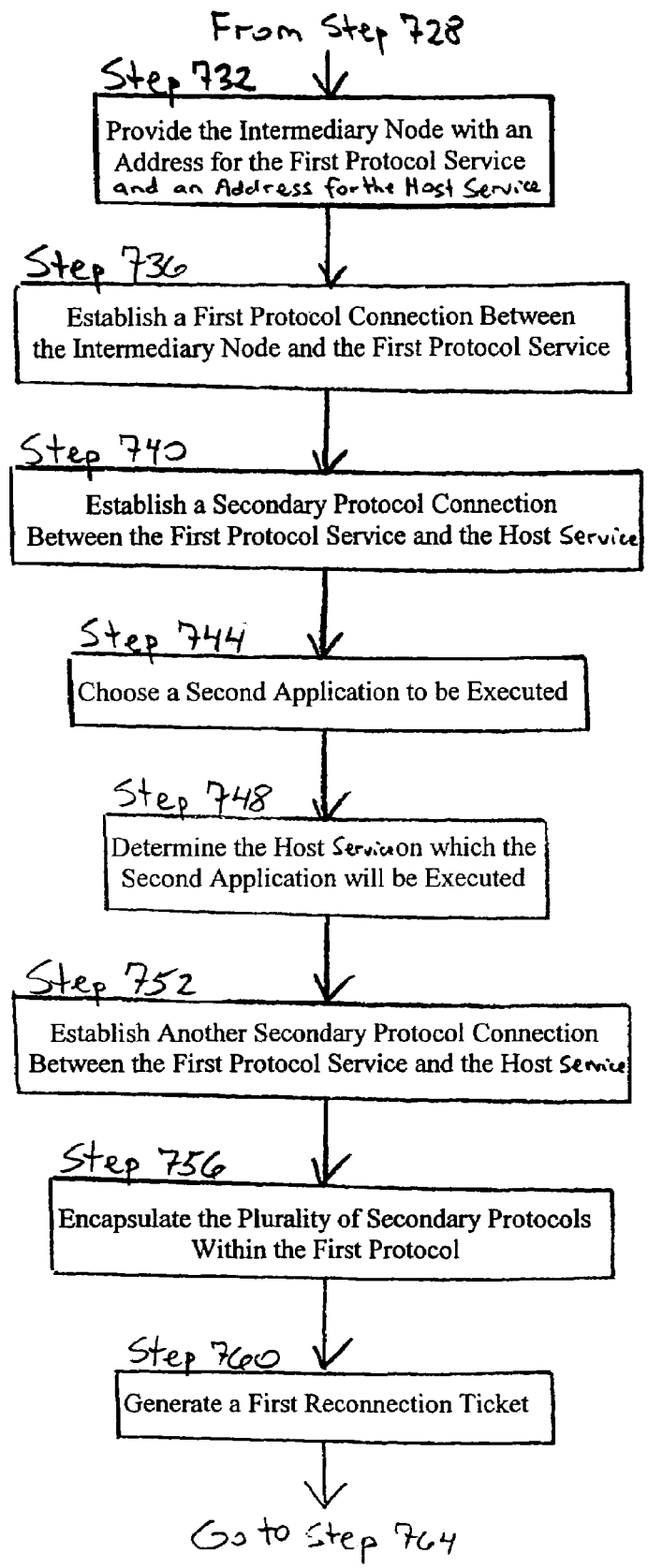
Figure 8C:
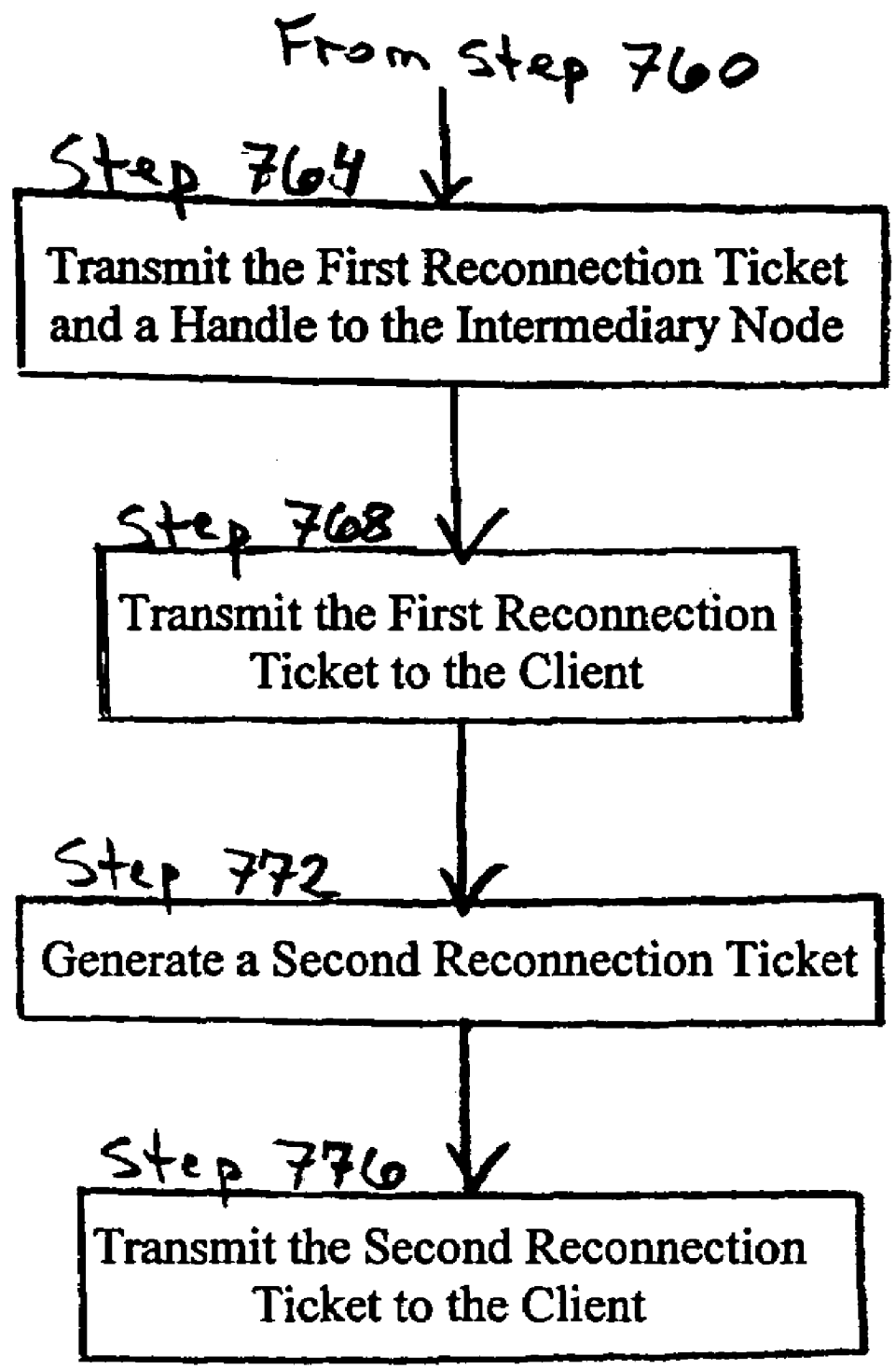

Referring to FIGS. 8A-8C, one embodiment of a method 700 for initially connecting the client 108 to the host services 116 (for example at step 604 of FIG. 7), using the exemplary embodiment of FIG. 6A-6C, is illustrated.

At step 704, the client 108, using the browser 148, sends a request, such as, for example, an HTTP request, to the first computing node 140. The first computing node 140 returns a web page, such as, for example, an HTML form requesting authentication information (e.g., a username and a password). A user of the client 108 enters his credentials and transmits the completed form to the first computing node 140.

The first computing node 140, at step 708, then informs the user of the client 108 of applications available for execution. In one embodiment, the first computing node 140 extracts the user's credentials from the logging page and transmits them to the second computing node 144, together with a request for the second computing node 144 to enumerate the applications available to the user. Based on the user's credentials, the second computing node 144 returns a list of specific applications available to the user to the first computing node 140, which then forwards the list, in the form of a web page for example, to the user of the client 108.

At step 712, the user selects the desired application and a request for that application is sent to the first computing node 140. For example, in one embodiment, the user clicks on a desired application listed in the web page presented to him by the first computing node 140 and an HTTP request for that application is forwarded to the first computing node 140. The request is processed by the first computing node 140 and forwarded to the second computing node 144.

At step 716, the second computing node 144 determines the host service 116 on which the desired application will be executed. The second computing node 144 can make that determination based, for example, on a load balancing equation. In one embodiment, the second computing node 144 also determines a first protocol service 112 from amongst a plurality of first protocol services 112 that will be used to communicate with the host service 116 via a connection 124. Again, the second computing node 144 can make that determination based, for example, on a load balancing equation. The second computing node 144 returns the address of the chosen host service 116 and the chosen first protocol service 112 to the first computing node 140.

The client 108, at step 720, is then provided with an initial connection ticket and an address for the intermediary node 132 (which is either its actual address or its virtual address, as described below). In one embodiment, the first computing node 140 provides the address for the chosen host service 116 and the chosen first protocol service 112 to the ticket authority 136, together with a request for the initial connection ticket. The ticket authority 136 keeps the address of the chosen host service 116 and the chosen first protocol service 112, generates the initial connection ticket, and transmits the initial connection ticket to the first computing node 140, while keeping a copy for itself.

The first computing node 140, configured, in one embodiment, with the actual address of the intermediary node 132, then transmits the actual address of the intermediary node 132 and the initial connection ticket to the browser 148 of the client 108. The first computing node 140 can, for example, first create a file containing both the actual address of the intermediary node 132 and the initial connection ticket and then transmitting the file to the browser 148 of the client 108. Optionally, in another embodiment, the first computing node 140 is configured with the actual address of two or more intermediary nodes 132. In such an embodiment, the first computing node 140 first determines the intermediary node 132 through which messages between the client 108 and the first protocol service 112 will have to pass. The first computing node 140 then transmits the actual address of that chosen intermediary node 132 and the initial connection ticket to the browser 148 of the client 108 using, for example, the file described above. In one embodiment, the first computing node 140 chooses the intermediary node 132 using a load balancing equation. The client agent 128 of the client 108 is then launched and uses the address of the intermediary node 132, to establish, at step 724, a first protocol connection 120a between the client agent 128 of the client 108 and the intermediary node 132.

Alternatively, in another embodiment, the first computing node 140 is configured with an actual address of the third computing node 146, which serves as a virtual address of an intermediary node 132. In such an embodiment, the first computing node 140 transmits, at step 720, the actual address of the third computing node 146 and the initial connection ticket to the browser 148 of the client 108 using, for example, the file described above. The client agent 128 of the client 108 is then launched and uses the actual address of the third computing node 146 to establish, at step 724, a first protocol connection between the client agent 128 of the client 108 and the third computing node 146. The third computing node 146 then determines the intermediary node 132 through which messages between the client 108 and the first protocol service 112 will have to pass. In one embodiment, the third computing node 146 chooses the intermediary node 132 using a load balancing equation. Having chosen the intermediary node 132, the third computing node 146 establishes a first protocol connection to the intermediary node 132. A first protocol connection 120a therefore exists, through the third computing node 146, between the client agent 128 of the client 108 and the intermediary node 132. The actual address of the third computing node 146 is therefore mapped to the actual address of the intermediary node 132. To the client agent 128 of the client 108, the actual address of the third computing node 146 therefore serves as a virtual address of the intermediary node 132.

In one embodiment, where more than one level of intermediary nodes 132 exist, as described above, the first computing node 140 or the third computing node 146, respectively, only choose the intermediary node 132 to which the client agent 128 will connect at level "a." In such an embodiment, at each of the levels "a"-"n−1", the intermediary node 132 through which the client agent 128 is routed at that level thereafter determines, based on a load balancing equation for example, the intermediary node 132 to which it will connect at the next level. Alternatively, in other embodiments, the first computing node 140 or the third computing node 146, respectively, determine, for more than one or all of the levels "a"-"n", the intermediary nodes 132 through which the client agent 128 will be routed.

Having established the first protocol connection 120a between the client agent 128 of the client 108 and the intermediary node 132, for example the intermediate node 132 at level "n" (hereinafter referred to in method 700 as the intermediary node 132), the client agent 128 then transmits the initial connection ticket to the intermediary node 132.

It is then determined, at step 728, whether the initial connection ticket is valid. In one embodiment, the intermediary node 132 transmits the initial connection ticket to the ticket authority 136 for validation. In one embodiment, the ticket authority 136 determines the validity of the initial connection ticket by comparing it to the copy of the initial connection ticket it kept at step 720. If the ticket authority 136 determines the initial connection ticket to be valid, the ticket authority 136 transmits, at step 732, the address of the first protocol service 112 and the address of the chosen host service 116 to the intermediary node 132. The first protocol service 112 can also delete the initial connection ticket and the copy thereof. If, on the other hand, the ticket authority 136 determines the initial connection ticket to be invalid, the client 108 is, at step 730, refused connection to the first protocol service 112 and, consequently, connection to the host service 116.

Following step 732, the intermediary node 132 uses the address of the chosen first protocol service 112 to establish, at step 736, a first protocol connection 120b between the intermediary node 132 and the first protocol service 112. A first protocol connection 120 therefore now exists, through the intermediary node 132, between the client agent 128 of the client 108 and the first protocol service 112. The intermediary node 132 can also pass the address of the chosen host service 116 to the first protocol service 112.

In one embodiment, at step 740, the first protocol service 112 uses the address of the chosen host service 116 to establish a secondary protocol connection 124 between the first protocol service 112 and the chosen host service 116. For example, the chosen host service 116 is in fact the host service 116a and a secondary protocol connection 124a is established between the first protocol service 112 and the host service 116a.

In one embodiment, following step 740, the user chooses, at step 744, a second application to be executed and the second computing node 144 determines, at step 748, the host service 116 on which the second application is to be executed. For example, by calculating a load balancing equation, the second computing node 144 may choose the host service 116b to execute the second application program. The second computing node 144 then transmits the address of the chosen host service 116b to the first protocol service 112. In one embodiment, the second computing node 144 is in direct communication with the first protocol service 112 and directly transmits the address thereto. In another embodiment, the address of the chosen host service 116b is indirectly transmitted to the first protocol service 112. For example, the address can be transmitted to the first protocol service 112 through any combination of the first computing node 140, the ticket authority 136, the intermediary node 132, and the first protocol service 112. Having received the address of the chosen host service 116b, the first protocol service 112 establishes, at step 752, a secondary protocol connection 124b between the first protocol service 112 and the chosen host service 116b.

The secondary protocols that can be used to communicate over the connections 124a and 124b include, but are not limited to, HTTP, FTP, Oscar, Telnet, ICA, and RDP. Moreover, in one embodiment, at least one of the secondary protocols, as described above, includes a plurality of virtual channels, each of which can include a plurality of protocol packets enabling functionality at the remote client 108. For example, in one embodiment, one host service 116a is a web server, communicating with the first protocol service 112 over the connection 124a using the HTTP protocol, and another host service 116b is an application server, communicating with the first protocol service 112 over the connection 124b using the ICA protocol. The host service 116b generates both protocol packets for transmitting graphical screen commands to the client 108, for causing the client 108 to display a graphical user interface, and protocol packets for transmitting printer commands to the client 108, for causing a document to be printed at the client 108.

Steps 744, 748, and 752 can be repeated any number of times. As such, any number of application programs can be executed on any number of host services 116a-116n, the outputs of which can be communicated to the first protocol service 112 over the connections 124a-124n using any number of secondary protocols.

Turning now to step 756, the first protocol service 112 can, as described above, encapsulate the plurality of secondary protocols within the first protocol. As such, the client 108 is connected to, and simultaneously communicates with, a plurality of host services 116.

In another embodiment, prior to performing steps 744, 748, and 752 to execute a new application program on a host service 116, such as, for example, the host service 116b, a user of the client 108 ends execution of another application program, such as, for example, an application program executing on host service 116a. In such a case, the first protocol service 112 disrupts the connection 124a between the first protocol service 112 and the host service 116a. The first protocol service 112 then establishes, by implementing steps 744, 748, and 752, the connection 124b between the first protocol service 112 and the host service 116b, without interrupting the connection 120 between the client 108 and the first protocol service 112.

In one embodiment, a first re-connection ticket is generated at step 760. For example, the intermediary node 132 requests a first re-connection ticket from the ticket authority 136. Upon receiving the request, the ticket authority 136 generates the first re-connection ticket, which is, for example, a large random number, and can also generate a handle, which is, for example, a smaller random number. The ticket authority 136 can then transmit, at step 764, the first re-connection ticket and the handle to the intermediary node 132, while keeping a copy of the first re-connection ticket and a copy of the handle. The ticket authority 136 continues to maintain the address of the first protocol service 112 that was transmitted to it by the first computing node 140 at step 720. The intermediary node 132 then transmits, at step 768, the first re-connection ticket to the client 108.

At step 772, a second re-connection ticket is then generated. In one embodiment, the first protocol service 112 generates the second re-connection ticket, which can be, for example, a large random number. The first protocol service 112, at step 776, then transmits the second re-connection ticket, through the intermediary node 132, to the client 108. In doing so, the first protocol service 112 keeps a copy of the second re-connection ticket and a session number associated therewith for identifying the session to be re-connected following a disruption of the connection 120. In one embodiment, for example, the first protocol service 112 maintains, for a particular session number, a table listing the secondary protocol connections 124a-124n associated with that session number. Accordingly, following re-establishment of the first protocol connection 120 and validation of the second re-connection ticket at the first protocol service 112, as described below, the first protocol service 112 can identify the secondary protocol connections 124 to be encapsulated within the re-established first protocol connection 120 for communication to the client 108.

Alternatively, in another embodiment, and with reference again to FIG. 1A, the system 100 of the present invention does not include the intermediary node(s) 132, the ticket authority 136, nor the third computing node 146. In such an embodiment, rather than generating and transmitting, at steps 760 through 776, both the first and the second reconnection ticket, the system 100 and method 700 provide for only a single re-connection ticket. In one such embodiment, the first protocol service 112, for example, generates the single re-connection ticket, which can be, for example, a large random number. The first protocol service 112 then transmits the single re-connection ticket directly to the client 108 over the connection 120. In doing so, the first protocol service 112 keeps a copy of the single re-connection ticket and a session number associated therewith for identifying the session to be re-connected following a disruption of the connection 120.

Figure 9:
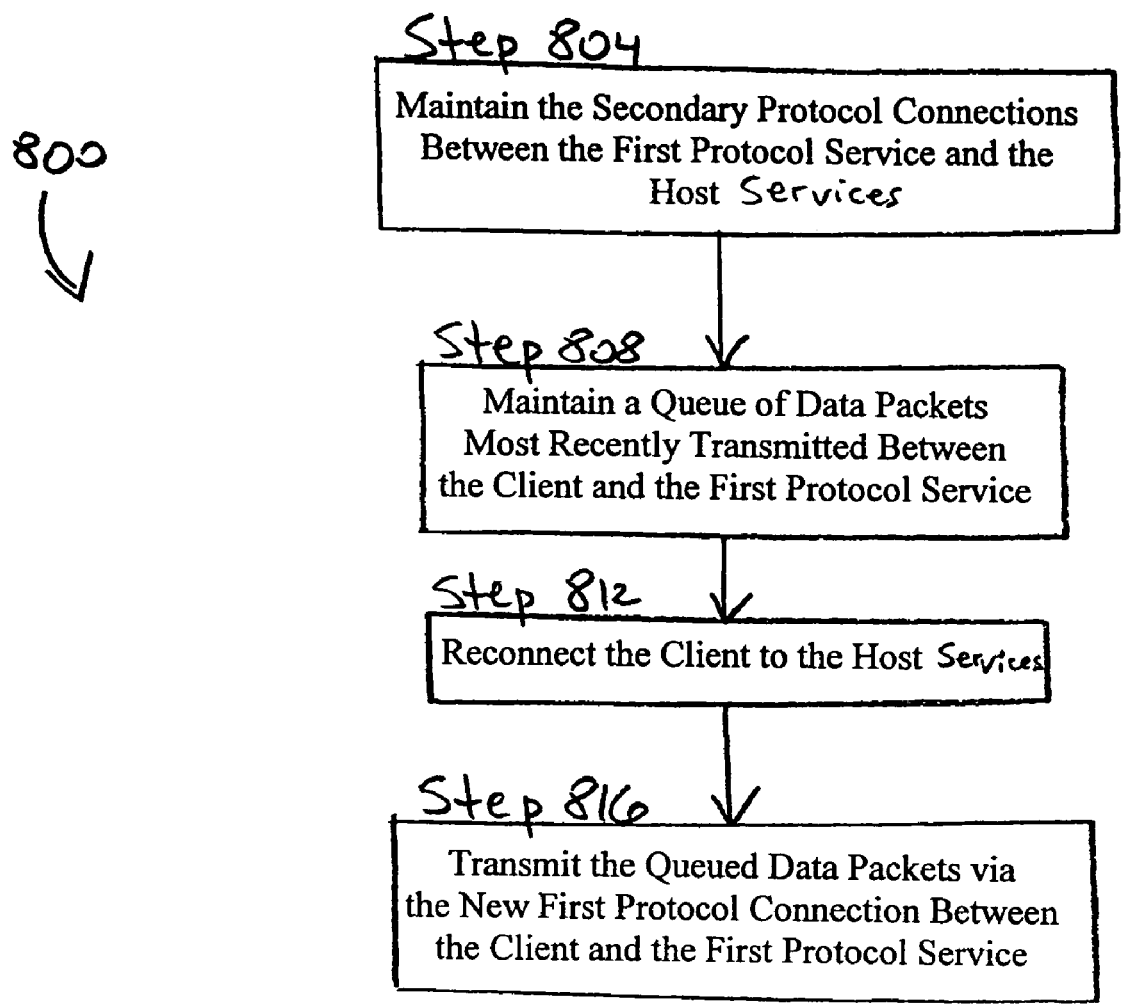
FIG. 9 is a flow diagram of a method for providing a client with a reliable connection to host services and for re-connecting the client to the host services according to an illustrative embodiment of the invention.

Referring now to FIG. 9, one embodiment of a method 800 for providing a client 108 with a reliable connection to one or more host services 116 and for re-connecting the client 108 to the host services 116 (for example at step 616 of FIG. 7), using the exemplary embodiment of FIGS. 6A-6C, is illustrated. In particular, at step 804, the secondary protocol connection 124 between the first protocol service 112 and each of the one or more host services 116 is maintained. Moreover, at step 808, a queue of data packets most recently transmitted between the client agent 128 of the client 108 and the first protocol service 112, via the connection 120 that was determined to have broken, for example, at step 616 of FIG. 7, is maintained. In one embodiment, the data packets are queued and maintained both before and upon failure of the connection 120. The queued data packets can be maintained, for example, in a buffer by the client agent 128. Alternatively, the first protocol service 112 can maintain in a buffer the queued data packets. In yet another embodiment, both the client agent 128 and the first protocol service 112 maintain the queued data packets in a buffer.

At step 812, a new first protocol connection 120 is established between the client agent 128 of the client 108 and the first protocol service 112 and linked to the maintained secondary protocol connection 124 between the first protocol service 112 and each of the one or more host services 116, thereby re-connecting the client 108 to the host services 116. After the client 108 is re-connected, the queued data packets maintained at step 808 can be transmitted, at step 816, via the newly established first protocol connection 120. As such, the communication session between the host services 116 and the client 108, through the first protocol service 112, is persistent and proceeds without any loss of data.

Figure 10A:
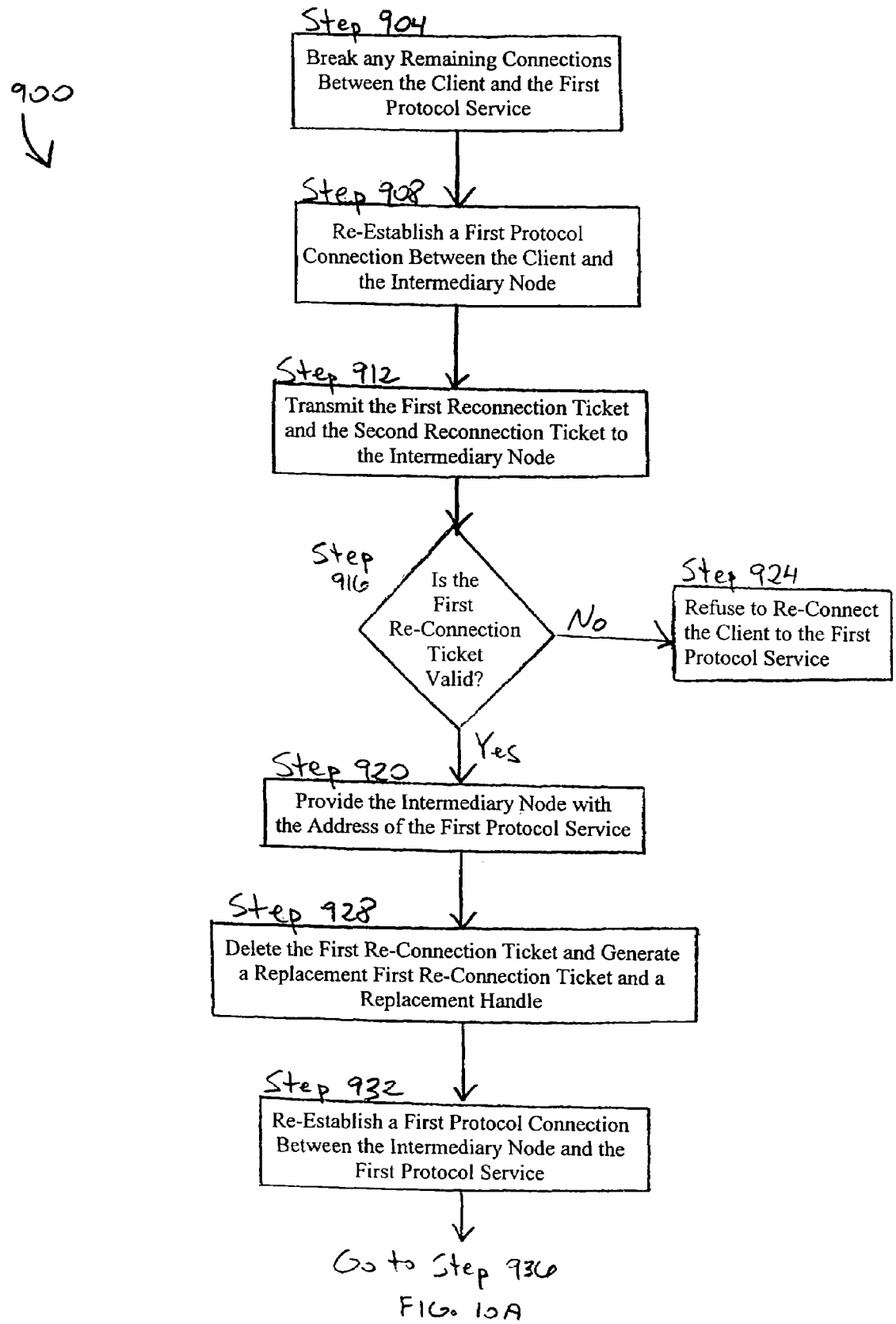
FIGS. 10A-10B are flow diagrams of a method for re-connecting a client to host services according to an illustrative embodiment of the invention.
Figure 10B:
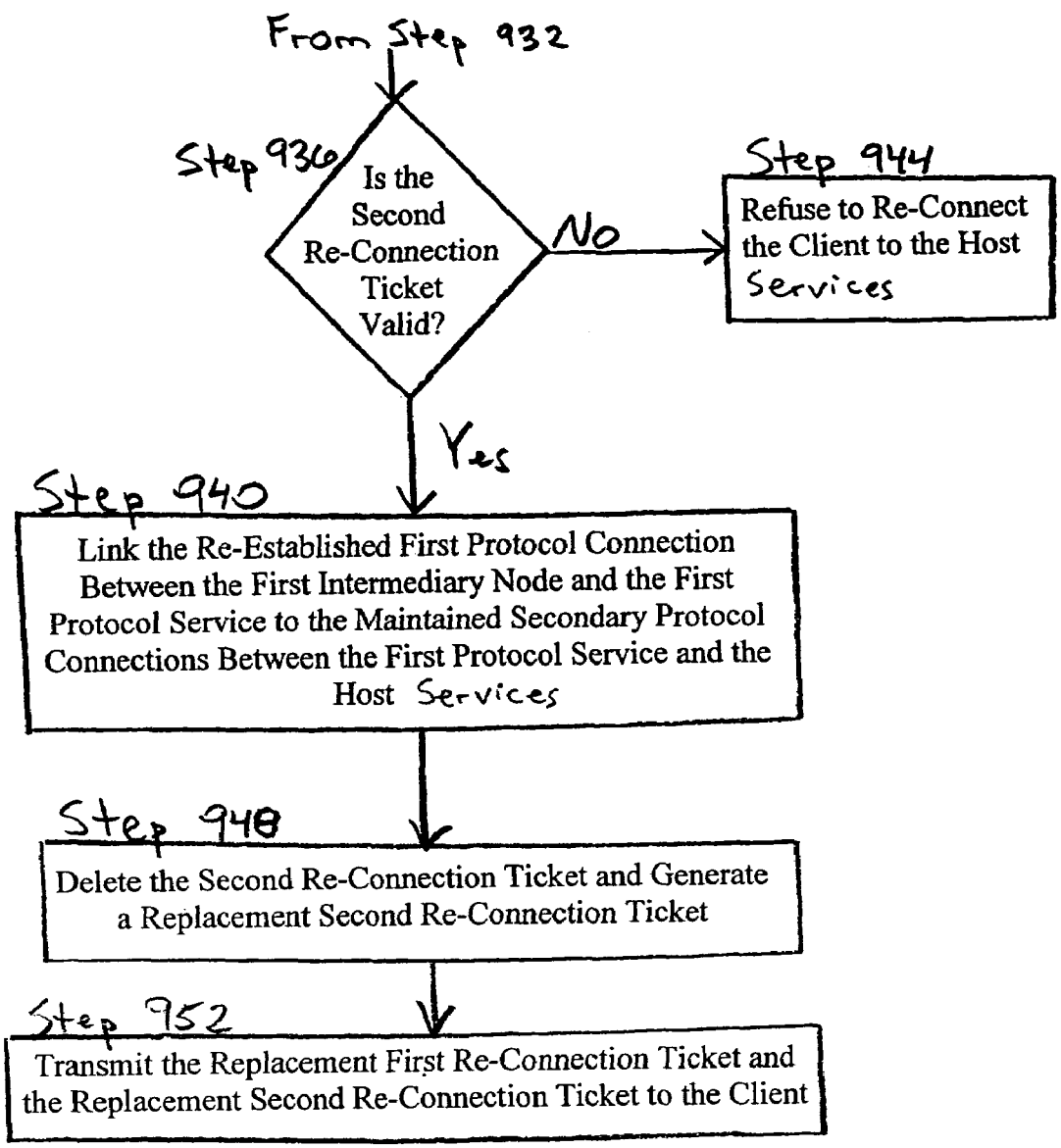

Referring now to FIGS. 10A-10B, one embodiment of a method 900 for re-connecting the client 108 to the one or more host services 116 (for example at step 812 of FIG. 9), using the exemplary embodiment of FIGS. 6A-6C, is illustrated.

At step 904, any remaining connections between the client 108 and the first protocol service 112 are broken. For example, where the connection 120a has failed, but the connection 120b has not, the connection 120b is broken. Alternatively, where the connection 120b has failed, but the connection 120a has not, the connection 120a is broken.

In one embodiment, using the actual address of the intermediary node 132 provided to the client 108, for example at step 720 of FIG. 8, the client agent 128 of the client 108 then re-establishes, at step 908, the first protocol connection 120a between the client agent 128 and the intermediary node 132. Alternatively, in another embodiment, using the actual address of the third computing node 146 provided to the client 108, for example at step 720 of FIG. 8, the client agent 128 of the client 108 then re-establishes, at step 908, a first protocol connection between the client agent 128 and the third computing node 146. The third computing node 146 then determines the intermediary node 132 through which messages between the client 108 and the first protocol service 112 will have to pass. In one embodiment, the third computing node 146 chooses the intermediary node 132 using a load balancing equation. The intermediary node 132 chosen by the third computing node 146 in re-connecting the client 108 to the one or more host services 116 can be different from that chosen, for example at step 720 of FIG. 8, to initially connect the client 108 to the one or more host services 116. Having chosen the intermediary node 132, the third computing node 146 re-establishes a first protocol connection to the intermediary node 132. A first protocol connection 120a is therefore re-established, through the third computing node 146, between the client agent 128 of the client 108 and the intermediary node 132.

In one embodiment, where more than one level of intermediary nodes 132 exist, the intermediary node 132 through which the client agent 128 is routed at each of the levels "a"-"n-1" thereafter determines, based on a load balancing equation for example, the intermediary node 132 to which it will connect at the next level. Alternatively, in another embodiment, the third computing node 146 determines, for more than one or all of the levels "a"-"n", the intermediary nodes 132 through which the client agent 128 will be routed.

Having re-established the first protocol connection 120a between the client agent 128 of the client 108 and the intermediary node 132, for example the intermediate node 132 at level "n" (hereinafter referred to in method 900 as the intermediary node 132), the client agent 128 then transmits, at step 912, the first re-connection ticket and the second re-connection ticket to the intermediary node 132.

It is then determined, at step 916, whether the first re-connection ticket is valid. In one embodiment, the validity of the first re-connection ticket is determined by using the ticket authority 136. For example, the intermediary node 132 transmits the first re-connection ticket to the ticket authority 136. In one embodiment, the ticket authority 136 determines the validity of the first re-connection ticket by comparing it to a previously kept copy of the first re-connection ticket. If the ticket authority 136 determines the first re-connection ticket to be valid, the ticket authority 136 transmits, at step 920, the address of the first protocol service 112 to the intermediary node 132. Otherwise, if the ticket authority 136 determines the first re-connection ticket to be invalid, the client 108 is, at step 924, refused re-connection to the first protocol service 112 and, consequently, re-connection to the host services 116.

At step 928, the first re-connection ticket is deleted by, for example, the ticket authority 136 and a replacement first re-connection ticket is generated by, for example, the ticket authority 136. Moreover, a replacement handle can be generated by, for example, the ticket authority 136. In some such embodiments, the ticket authority 136 transmits the replacement first re-connection ticket and the replacement handle to the intermediary node 132. Moreover, in some such embodiments, the ticket authority 136 keeps a copy of the replacement first re-connection ticket. In some embodiments, the ticket authority 136 waits for the client 108 to acknowledge that it has received the replacement first re-connection ticket before it proceeds to delete the first re-connection ticket.

After the first re-connection ticket is validated, the intermediary node 132, using the address of the first protocol service 112, re-establishes, at step 932, the first protocol connection 120b between the intermediary node 132 and the first protocol service 112. Having re-established the first protocol connection 120b between the intermediary node 132 and the first protocol service 112, it is then determined, at step 936, whether the second re-connection ticket is valid. In one embodiment, the validity of the second re-connection ticket is determined by using the first protocol service 112. For example, the intermediary node 132 transmits the second re-connection ticket to the first protocol service 112. In one embodiment, the first protocol service 112 determines the validity of the second re-connection ticket by comparing it to a previously kept copy of the second re-connection ticket. If the first protocol service 112 determines the second re-connection ticket to be valid, the re-established first protocol connection 120b between the first intermediary node 132 and the first protocol service 112 is linked, at step 940, to the maintained secondary protocol connection 124 between the first protocol service 112 and each of the one or more host services 116. Otherwise, if the first protocol service 112 determines the second re-connection ticket to be invalid, the re-established first protocol connection 120b is not linked to the one or more maintained secondary protocol connections 124 and the client 108 is, at step 944, refused re-connection to the one or more host services 116.

At step 948, the second re-connection ticket is deleted by, for example, the first protocol service 112 and a replacement second re-connection ticket is generated by, for example, the first protocol service 112 for transmission to the client 108. In such an embodiment, the first protocol service 112 keeps a copy of the replacement second re-connection ticket. In some embodiments, the first protocol service 112 waits for the client 108 to acknowledge that it has received the replacement second re-connection ticket before it proceeds to delete the second re-connection ticket.

At step 952, the replacement first re-connection ticket and the replacement second re-connection ticket are transmitted to the client. For example, the ticket authority 136 can transmit, through the intermediary node 132, the replacement first re-connection ticket to the client 108. Moreover, in one embodiment, the first protocol service 112 transmits, through the intermediary node 132, the replacement second re-connection ticket to the client 108.

Alternatively, in other embodiments, as discussed above, the system 100 and methods of the invention provide for only a single re-connection ticket. As such, rather than using both first and second re-connection tickets, the method 900 of the invention uses only the aforementioned single re-connection ticket. In one such embodiment, the client agent 128 of the client 108 is also provided with the address of the first protocol service 112. To re-connect to the host services 116, the client agent 128 transmits the single re-connection ticket directly to the first protocol service 112. The first protocol service 112 then determines whether the single re-connection ticket is valid. In one embodiment, the first protocol service 112 determines the validity of the single re-connection ticket by comparing it to a previously kept copy of the single re-connection ticket. If the first protocol service 112 determines the single re-connection ticket to be valid, the re-established first protocol connection 120 between the client 108 and the first protocol service 112 is linked to the maintained secondary protocol connection 124 between the first protocol service 112 and each of the one or more host services 116. Otherwise, if the first protocol service 112 determines the single re-connection ticket to be invalid, the re-established first protocol connection 120 is not linked to the one or more maintained secondary protocol connections 124 and the client 108 is refused re-connection to the one or more host services 116.

After the single re-connection ticket is validated, the single re-connection ticket is deleted by, for example, the first protocol service 112 and a replacement single re-connection ticket is generated by, for example, the first protocol service 112 for transmission to the client 108. In transmitting the replacement single re-connection ticket to the client 108, the first protocol service 112 keeps a copy of the replacement single re-connection ticket. In some embodiments, the first protocol service 112 waits for the client 108 to acknowledge that it has received the replacement single re-connection ticket before it proceeds to delete the single re-connection ticket.

In yet another embodiment, like the first and second re-connection tickets, the single re-connection ticket is configured for automatic deletion after a pre-determined period of time following a failure in the connection 120, as at step 612, and/or following a clean termination of the connection 120, as at step 620.

Variations, modifications, and other implementations of what is described herein will occur to those of ordinary skill in the art without departing from the spirit and the scope of the invention. The invention is not to be defined only by the preceding illustrative description.

What is claimed is:

1. A method for providing a client with a reliable connection to a host service, the method comprising:
    establishing, by an agent of a client, stored in memory, a first connection between the client and a first protocol service, stored in memory, using a first protocol communicated over a transport layer protocol, the first protocol being an application level tunneling protocol for encapsulating a plurality of secondary protocols, the agent configured to encapsulate a second protocol within the first protocol and communicate to a host service, stored in memory, using the second protocol;
    establishing a second connection between the first protocol service and the host service using one of the plurality of the secondary protocols;
    maintaining a queue of data packets most recently transmitted via the first connection on at least one of the client and the first protocol service; and
    upon failure of the first connection:
        maintaining the second connection;
        continuing to maintain the queue of data packets most recently transmitted via the first connection; and
        establishing a third connection between the client and the first protocol service using the first protocol.

2. The method of claim 1 further comprising transmitting at least one of the queued data packets via the third connection.

3. The method of claim 1 further comprising closing, by the client or the host service, a first session established with the second protocol.

4. The method of claim 1 further comprising maintaining, by the first protocol service, the first connection with the client established with the first protocol.

5. The method of claim 1, wherein the agent comprises one of an Independent Computing Architecture (ICA) client or a Remote Desktop Protocol (RDP) client.

6. The method of claim 1 wherein the first connection between the client and the first protocol service is established via an intermediary node.

7. The method of claim 1 further comprising compressing communications at a level of the first protocol.

8. The method of claim 1 further comprising encrypting communications at the level of the first protocol.

9. The method of claim 1, wherein the transport layer protocol is Transport Control Protocol (TCP).

10. The method of claim 1 wherein the second protocol comprises one of: Hyper Text Transfer Protocol (HTTP), Remote Desktop Protocol (RDP), Independent Computing Architecture (ICA), File Transfer Protocol (FTP), Oscar and Telnet.

11. The method of claim 1 comprising the steps of:
closing connections established with the second protocol; and
maintaining the first connection established with the first protocol.

12. The method of claim 1 wherein the first connection is secure and comprising the steps of:
establishing a second connection between the first protocol service and the host service;
communicating between the client and the host service via the first connection and the second connection;
interrupting the second connection;
establishing a third connection between the first protocol service and a second host service without interrupting the first connection; and
communicating between the client and the second host service via the first connection and the third connection.

13. A system for providing a client with a reliable connection to a host service, the system comprising:
a first protocol service, stored in memory, configured to establish a first connection with the client using a first protocol communicated over a transport layer protocol, the first protocol being an application level tunneling protocol for encapsulating a plurality of secondary protocols, establish a second connection with the host service, stored in memory, using a second protocol, and, upon failure of the first connection, maintain the second connection and accept a third connection from the client;
an agent of a client, stored in memory and configured to encapsulate the second protocol within the first protocol and to communicate to the host service using the second protocol;
the host service configured to accept the second connection with the first protocol service and, upon failure of the first connection: maintain the second connection,
wherein the first connection and the third connection are each established using a first protocol, the first protocol for encapsulating the plurality of secondary protocols, and wherein at least one of the client and the first protocol service is further configured to maintain, before and upon failure of the first connection; a queue of data packets most recently transmitted via the first connection.

14. The system of claim 13 wherein the client is further configured to transmit at least one of the queued data packets via the third connection.

15. The system of claim 13 wherein the first protocol service is further configured to transmit at least one of the queued data packets via the third connection.

16. The system of claim 13 wherein the agent comprises one of an Independent Computing Architecture (ICA) client or Remote Desktop Protocol (RDP) client.

17. The system of claim 13 wherein the first connection between the client agent and the first protocol service is established via an intermediary node.

18. The system of claim 13 wherein the client agent compresses communications at a level of the first protocol.

19. The system of claim 13 wherein the client agent encrypts communications at the level of the first protocol.

20. The system of claim 13 wherein the first protocol is Transport Control Protocol (TCP).

21. The system of claim 13 wherein the second protocol comprises one of the following: Hyper Text Transfer Protocol (HTTP), Remote Desktop Protocol (RDP), Independent Computing Architecture (ICA), File Transfer Protocol (FTP), Oscar and Telnet.

22. The system of claim 13 wherein the connection established with the second protocol is closed and the connection established with the first protocol is maintained.

23. The system of claim 13 further comprising a second host service communicating with the client via the first connection and a third connection, the third connection established between the first protocol service and the second host service without interrupting the first connection and interrupting the second connection, the second connection established between the first protocol service and the host service and the client communicating with the host service via the first connection and the second connection.

* * * * *